(12) United States Patent
Feinstein

(10) Patent No.: US 10,579,247 B2
(45) Date of Patent: *Mar. 3, 2020

(54) MOTION-BASED VIEW SCROLLING WITH AUGMENTED TILT CONTROL

(71) Applicant: David Y. Feinstein, Bellaire, TX (US)

(72) Inventor: David Y. Feinstein, Bellaire, TX (US)

(73) Assignee: Innoventions, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/171,324

(22) Filed: Oct. 25, 2018

(65) Prior Publication Data

US 2019/0073105 A1 Mar. 7, 2019

Related U.S. Application Data

(63) Continuation of application No. 15/394,643, filed on Dec. 29, 2016, now Pat. No. 10,126,839, which is a
(Continued)

(51) Int. Cl.
*G09G 5/00* (2006.01)
*G06F 3/0485* (2013.01)
(Continued)

(52) U.S. Cl.
CPC .......... *G06F 3/0485* (2013.01); *G06F 1/1694* (2013.01); *G06F 3/0346* (2013.01);
(Continued)

(58) Field of Classification Search
CPC ........ G06F 3/0485; G06F 3/0346; G06F 3/03; G06F 3/017; G06F 2200/1637
See application file for complete search history.

(56) References Cited

U.S. PATENT DOCUMENTS 6,201,554 B1  3/2001 Lands
6,288,704 B1  9/2001 Flack et al.
(Continued)

FOREIGN PATENT DOCUMENTS

EP  1814019 A2  8/2007
EP  1290672 B1  1/2008

OTHER PUBLICATIONS

Innoventions, Inc., RotoView Technology White Paper, Aug. 2013, 6 pages, http://www.rotoview.com/white_paper.htm.
(Continued)

*Primary Examiner* — Vijay Shankar

(57) ABSTRACT

Systems and methods for motion-based scrolling of contents view on a display with a screen view that is smaller than the contents view are described. During an augmented tilt control mode, scrolling follows changes in a primary tilt direction aligned with the scrolling direction, while a secondary tilt along a direction perpendicular to the scrolling direction is used to modify at least one scrolling control parameter. The scrolling control may follow a Proportional Scroll mode, where the primary tilt directly controls the screen view position over the contents view, or follow a Dynamic Scroll mode, where the primary tilt controls the scrolling speed. In some implementations, the scroll mode is determined automatically based on the magnification of the contents view. A predefined gestured in the secondary tilt may temporarily override the scroll mode selection. In some implementations with multi-directional scrolling, the current scrolling direction may be temporarily captured during the augmented tilt control mode so that tilt gestures along the direction perpendicular to the captured scrolling direction may be used to modify at least one control parameters.

20 Claims, 24 Drawing Sheets

Related U.S. Application Data continuation-in-part of application No. 15/130,485, filed on Apr. 15, 2016, now Pat. No. 10,031,657, which is a continuation of application No. 14/873,448, filed on Oct. 2, 2015, now Pat. No. 9,348,435, which is a continuation of application No. 14/340,476, filed on Jul. 24, 2014, now Pat. No. 9,181,760.

(60) Provisional application No. 61/858,603, filed on Jul. 25, 2013, provisional application No. 62/332,367, filed on May 5, 2016, provisional application No. 62/273,399, filed on Dec. 30, 2015.

(51) Int. Cl.
  *G06F 3/0346* (2013.01)
  *G06F 1/16* (2006.01)
  *H04L 29/08* (2006.01)
  *G06F 3/0484* (2013.01)

(52) U.S. Cl.
  CPC .......... *G06F 3/04847* (2013.01); *H04L 67/02* (2013.01); *G06F 2200/1637* (2013.01)

(56) References Cited

U.S. PATENT DOCUMENTS

| | | |
|---|---|---|
| 6,347,290 B1 | 2/2002 | Bartlett |
| 6,466,198 B1 | 10/2002 | Feinstein |
| 6,567,101 B1 | 5/2003 | Thomas |
| 6,624,824 B1 | 9/2003 | Tognazzini et al. |
| 6,765,553 B1 | 7/2004 | Odamura |
| 6,798,429 B2 | 9/2004 | Bradski |
| 6,933,923 B2 | 8/2005 | Feinstein |
| 7,667,686 B2 | 2/2010 | Suh |
| 8,175,798 B2 | 5/2012 | Orr et al. |
| 8,351,910 B2 | 1/2013 | Horodezky et al. |
| 8,381,102 B1 | 2/2013 | Scholler |
| 8,423,076 B2 | 4/2013 | Kim et al. |
| 8,645,871 B2 | 2/2014 | Fong et al. |
| 8,704,767 B2 | 4/2014 | Dodge et al. |
| 8,866,741 B2 | 10/2014 | Cho et al. |
| 8,890,898 B2 | 11/2014 | Tsai et al. |
| 9,181,760 B2 | 10/2015 | Feinstein |
| 9,348,435 B2 * | 5/2016 | Feinstein ............... G01B 21/22 |
| 9,459,705 B2 | 10/2016 | Matas et al. |
| 10,031,657 B2 * | 7/2018 | Feinstein ............... G01B 21/22 |
| 10,126,839 B2 * | 11/2018 | Feinstein ............. G06F 3/0485 |
| 2006/0164382 A1 | 7/2006 | Kulas et al. |
| 2015/0062178 A1 | 3/2015 | Matas et al. |
| 2015/0062179 A1 | 3/2015 | Matas et al. |

OTHER PUBLICATIONS

RotoView by Innoventions, Inc., Smart Scroll Technology for Smartphones and Other Handheld Devices, http://www.rotoview.com.

David Y. Feinstein, A View-Navigation System for Hand-Held Portable Display, Information Display, vol. 19, No. 7, Jul. 2003, 4 pages.

* cited by examiner

MOTION-BASED VIEW SCROLLING WITH AUGMENTED TILT CONTROL

CROSS-REFERENCE TO RELATED APPLICATIONS

This application is a continuation of U.S. application Ser. No. 15/394,643 filed Dec. 29, 2016, which is a continuation-in-part of U.S. application Ser. No. 15/130,485 filed Apr. 15, 2016, which is a continuation of U.S. application Ser. No. 14/873,448 filed Oct. 2, 2015, now U.S. Pat. No. 9,348,435, which is a continuation of U.S. application Ser. No. 14/340,476 filed Jul. 24, 2014, now U.S. Pat. No. 9,181,760, which claims the benefit of provisional patent application Ser. No. 61/858,603, filed Jul. 25, 2013, by the present inventor. This application claims the benefit of provisional patent applications Ser. No. 62/273,399, filed Dec. 30, 2015 and Ser. No. 62/332,367, filed May 5, 2016, by the present inventor. The entire disclosures of each of these prior applications are incorporated herein by reference.

STATEMENTS REGARDING FEDERALLY SPONSORED RESEARCH OR DEVELOPMENT

Not applicable.

REFERENCE TO A MICROFICHE APPENDIX

Not applicable

TECHNICAL FIELD

The disclosed embodiments relate generally to electronic devices with a display operable to scroll a virtual display of contents which may be larger than the actual size of the device's physical display.

BACKGROUND

Hand held devices with a small physical display must often show a virtual stored or computed contents view that is larger than the screen view of the physical display. Only a portion of the virtual display can be shown at any given time within the screen view, thus requiring an interactive process of view navigation that determines which particular portion of the virtual display is shown. This process must allow the user to scroll the entire virtual display. Various methods have been used to control view navigation, including touch screen gestures, keyboards, joysticks, voice commands, rotational and movement sensors, and visual gestures. Touch screen gestures, including single-touch and multi-touch gestures (also called "touch commands"), are today's most popular user interface in hand held devices to navigate (or "scroll") the display as well as to activate numerous functions and links.

Touch screen gestures normally require cumbersome, two-hand operation as the user holds the device with one hand and performs the gesture with the other. These touch gestures may cause unhealthy ergonomic strains on users, particularly when the user attempts to perform a single hand touch gesture. Even if the user is somehow able to perform touch commands with only one hand, the fingers that touch the screen are still always in the way, obstructing the screen view. Touch screen gestures often cause unintended activation of links that may be present on the screen during scrolling, and result in fingerprints and dirt being left on the screen. When the virtual display size is much larger than the screen size, many repeated touch screen commands are necessary for scrolling the contents.

A promising alternative is a view navigation system based on motion, which allows the users to scroll the display using only one hand and without obscuring the screen view by the fingers that are used for touch commands. In this disclosure, the term 'motion' refers to device motion that can be translated into a rotation (or tilt) change relative to a given baseline. This view navigation system of a mobile device may utilize a set of rotation and movement sensors including accelerometers, gyroscopes, tilt sensors, camera tilt detectors, magnetic sensors, multiple Infrared camera rotation sensors, as well as a combination of different sensor types.

An early motion-based view navigation system is disclosed in my U.S. Pat. Nos. 6,466,198 and 6,933,923 which are incorporated by reference herein in their entirety. These patents have been commercialized under the trade name "RotoView" and their development has been chronicled online at http://www.rotoview.com. The "RotoView" system is well adapted to navigate the device's screen view across an arbitrarily large contents view.

One challenge in motion-based view scrolling is the need to change scrolling speed or the scrolling distance dynamically when the contents view is significantly larger than the screen view. Mobile devices often display contents views that fit the height or the width of the screen view, so that scrolling is constrained to the horizontal or vertical direction. In mobile web browsing, scrolling is preferably constrained vertically, often resulting with a contents view with a height that is much larger than the screen view's height.

During motion-based view scrolling, scrolling follows movements and tilts in accordance with currently selected scrolling control parameters. It would be beneficial for the user to be able to modify the scrolling speed or the scrolling distance during the scrolling operation without the use of touch commands, or to have automatic modification of the scrolling control parameters to fit the current viewing condition.

It should be noted that the user gains the best viewing experience when the screen surface is held perpendicular to her eyes. An often encountered challenge in motion-based view scrolling system is the viewing quality experienced during the tilting of the device, when the device is held at an oblique angle to the line of sight.

Therefore, it would be desirable to provide methods and systems that can reduce or eliminate the above deficiencies and improve the user's experience during motion-based view scrolling. Such methods should also reduce the cognitive burden on the user and produce a more efficient user interface that is intuitive and easy to use.

SUMMARY

The present invention provides a motion-based view scrolling system that employs two selectable scrolling modes when responding to the device rotation, each operative with a set of scrolling control parameters. In the first mode, the system sets the screen view position over the contents view directly from the amount of the rotation from the initial tilt baseline that was captured when the scrolling process started. This mapping between the relative tilt to the scrolling distance is typically proportional. We will refer in this application to this mode of view navigation as Proportional Scroll mode. The Proportional Scroll uses a preset rotation range that allows full scrolling of the contents view from edge to edge. The second scrolling mode uses the relative rotation changes to dynamically control the speed of scrolling, as taught by my "RotoView" patents cited above. We will refer in this application to this mode of view navigation as Dynamic Scroll mode.

When the magnification of the contents view is relatively small, the Proportional Scroll provides a convenient view navigation experience. However, when the magnification becomes large, the Proportional Scroll mode forces the user to rotate the device across a wide rotation range in order to cover the entire contents view. This may require the user to look at the screen at a sharply oblique angle, which reduces the quality of image perception and the readability of the displayed information. While the rotation range can be lowered in order to allow more scrolling for less rotation, the scrolling accuracy is reduced and becomes less stable when a small rotation causes the display to scroll a large amount of the stored contents.

The user gains the best viewing experience when the screen surface is held perpendicular to her eyes. Since Dynamic Scroll uses rotation changes to determine the speed and direction of the scroll, the device is returned to its initial orientation at the end of the scroll. As the user is likely to start the scrolling process when the device is held perpendicular to the line of sight in order to maximize the viewing convenience, the device is returned to an optimal viewing condition at the end of the scroll. Hence Dynamic Scroll is very useful when the contents view is highly magnified. Since Proportional Scroll mode and Dynamic Scroll mode have weaknesses and advantages, it is important that the mode selection will be optimal, providing an intuitive and easy way to navigate the contents view.

In accordance with some embodiments, the selection between Proportional Scroll and Dynamic scroll is automatic. The Proportional Scroll mode is selected when the screen magnification is below a certain control value. When the screen magnification is above the control value, the Dynamic Scroll mode is selected. The user may override the selection using a hand gesture like a sharp tilt.

In accordance with some embodiments where scrolling is constrained to vertical scrolling or horizontal scrolling, rotation around an axis along the scrolling direction cannot scroll the screen view because the contents view has the same dimension as the screen view. Actual scrolling may occur only when the user rotates the device around an axis perpendicular to the scrolling direction, modifying a primary tilt of the device. In such embodiments, rotation around an axis along the scrolling direction can be used, when an Augmented Tilt Control mode is active, to modify a scrolling control parameter. We refer in this disclosure to the tilt around this axis along the scrolling direction as the secondary tilt of the device. During Dynamic Scroll mode, the changes in the secondary tilt of the device may modify the relation of the scrolling speed to the relative tilt in the direction of scrolling. During Proportional Scroll mode, the changes in the secondary tilt of the device may modify an important relevant scrolling control parameter—the rotation range.

In accordance with some embodiments, sharp, "spikelike" gestures in the secondary tilt may be used to activate a scrolling mode override, or to activate and deactivate the Augmented Tilt Control mode.

In accordance with some embodiments, the multi-directional scrolling direction may be captured to define a locked scrolling direction during an Augmented Tilt Control mode. Rotation around an axis perpendicular to the captured scrolling direction during the control period may be used to modify one or more scrolling control parameter, depending on the selected scrolling mode. The modified scrolling control parameter is applied to the multi-directional scrolling after the Augmented Tilt Control mode is deactivated.

In accordance with some embodiments, changes in the relative distance between the screen view and the user's eyes may be used to modify the scrolling performance during a control period selected by the user, or to activate and deactivate the Augmented Tilt Control mode.

Thus, portable computing devices with display and motion sensors are provided with more efficient and convenient methods for scrolling the display based on the device motion.

These and other advantages, objects and features of the present invention will become apparent from the accompanying drawings and descriptions, and from the claims.

BRIEF DESCRIPTION OF THE DRAWINGS

For a better understanding of the aforementioned embodiments of the invention as well as additional embodiments thereof, reference should be made to the Detailed Description of the invention, in conjunction with the following drawings. It should be understood that these drawings depict only exemplary embodiments of the present disclosure and are not therefore to be considered to be limiting its scope. In the drawings, like reference numerals designate corresponding elements, and closely related figures have the same number but different alphabetic suffixes.

DETAILED DESCRIPTION OF THE INVENTION

This section discusses various embodiments of the present invention in detail. While specific implementations are discussed, it should be understood that this is done for illustration purpose only. A person skilled in the relevant art will recognize that other methods, components and configurations may be used without parting from the spirit and scope of the present invention.

Hand held electronic devices typically have small screens and often need to show information contents that are larger than the size of their displays. They employ a contents view (also called "virtual display") which is stored in the device memory, while a part of the virtual display is shown in the screen view (also called "physical display" or "screen display"). In many systems, the contents view may be dynamically downloaded to the device (e.g. from the internet or externally connected devices) so that at various times only a part of the contents view is actually stored in the device. In other situations, the contents view may be programmatically updated or selectively loaded from local memory causing the contents view to change. The operator of the electronic device must be able to scroll the screen view over the contents view. It is important that the screen view navigation will be intuitive and easy to use.

Figure 1:
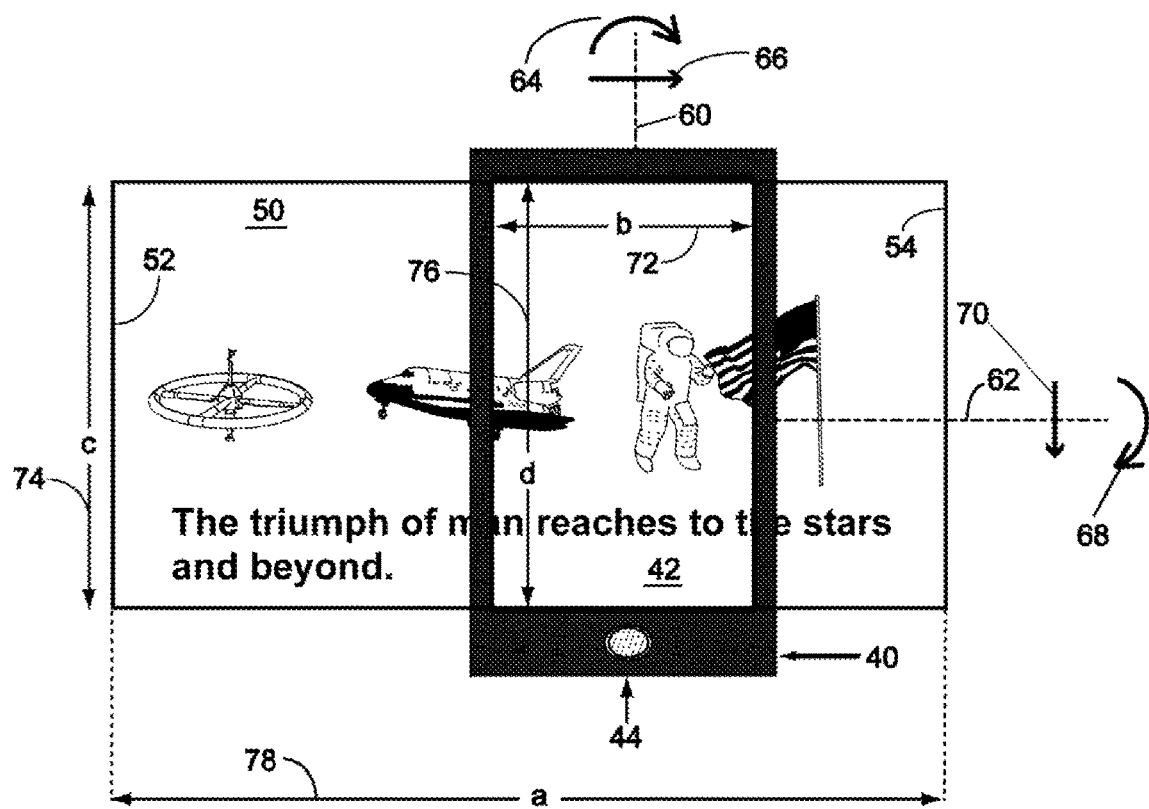
FIG. 1 outlines an example of a constrained horizontal scrolling where the width of the contents view is larger than the width of the physical display while the height of the contents view is equal or smaller than the height of the physical display.

FIG. 1 shows the geometric relation between the screen view 42 of the electronic device 40 and the contents view 50. The view navigation process determines which part of the contents view 50 is shown at the screen view 42 during the View Navigation mode, thus resulting in the scrolling of the contents view. In this example, an image is magnified so that the height (c) 74 of the contents view is the same as the height (d) 76 of the screen view, while the width (a) 78 of the contents view is larger than the width (b) 72 of the screen view. Hence the contents view 50 can be scrolled only horizontally. In general, tilt scrolling is confined to the horizontal direction when a>b and c<=d. We refer to the scrolling in FIG. 1 as constrained horizontal scrolling.

The user's three-dimensional tilt and movements of the hand held device 40 are generally projected into tilt changes relative to a baseline tilt along one or two generally perpendicular main axes placed on the surface of the display. These tilt changes control the actual horizontal and vertical scrolling. In the general case (shown in FIG. 16 below) where c>d and a>b, any arbitrary scrolling of said contents view 50 can be decomposed into a horizontal scrolling component and a vertical scrolling component.

Figure 2A:
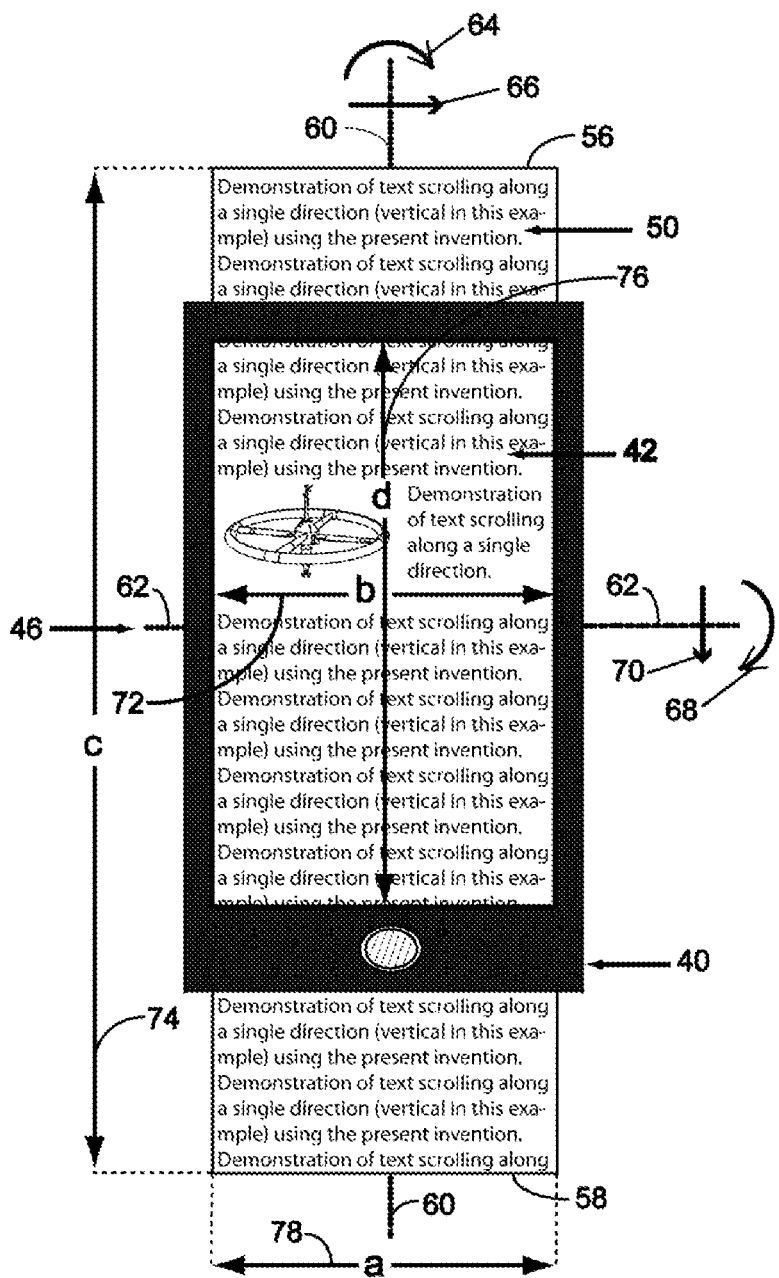
FIG. 2A outlines an example of a constrained vertical scrolling where the height of the contents view is larger than the height of the physical display while the width of the contents view is equal to or smaller than the width of the physical display.

FIG. 2A shows another example of tilt based scrolling where the contents view 50 illustrates text and embedded graphic images, as is commonly used in many mobile applications such as document viewers, web browsers and the like. In this example, the width (a) 78 of the contents view is the same as the width of the screen view (b) 72, while the height (c) 74 of the contents view is larger than the height (d) 76 of the screen view. Hence the contents view 50 can be scrolled only vertically from top end 56 to bottom end 58. In general, tilt scrolling is confined to the vertical direction when a<=b and c>d. We refer to the scrolling in FIG. 2A as constrained vertical scrolling. Constrained vertical scrolling is very common in mobile devices. In particular, modern mobile-friendly web sites must provide contents that require the mobile user to perform only constrained vertical scrolling.

In this disclosure, we may describe a constrained scrolling along a single direction without specifying either horizontal or vertical direction. We refer to such scrolling as a constrained unidirectional scrolling.

Figure 2B:
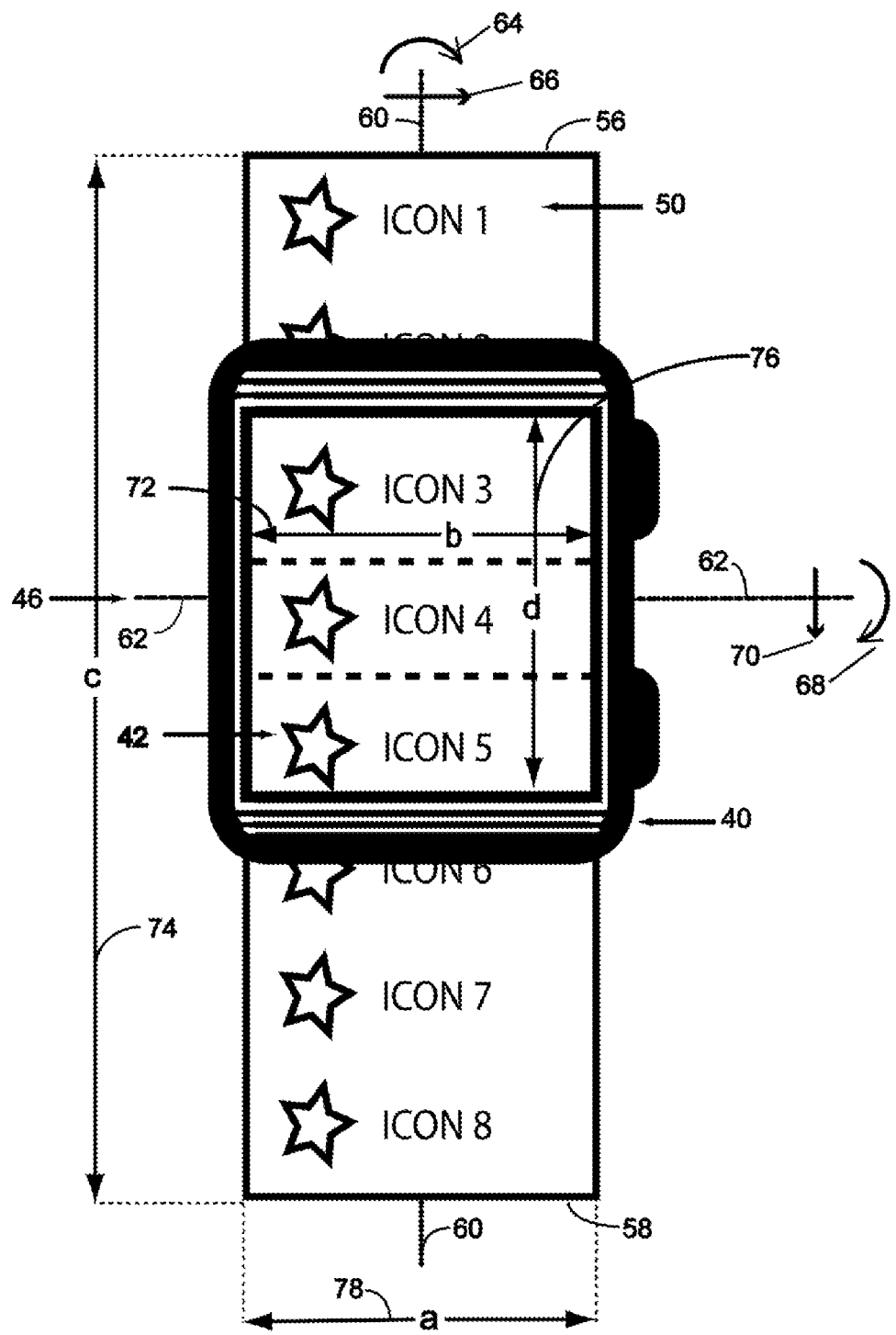
FIG. 2B demonstrates a constrained vertical scrolling in a smart watch.

FIG. 2B shows another embodiment where the hand held device 40 is a smart watch and the contents view 50 has a list of action icons to be selected by the user using wrist rotation. Like the constrained vertical scrolling example in FIG. 2A, the width (a) 78 of the contents view is the same as the width of the screen view (b) 72, while the height (c) 74 of the contents view is larger than the height (d) 76 of the screen view.

Borrowing from Avionics terminology, we say that axis 60 is set along the roll axis of the device 40 and axis 62 is set along the pitch axis of the device. Roll rotations cause changes in the main horizontal direction (also referred to as the "X" direction), while pitch rotations cause changes in the main vertical direction (also referred to as the "Y" direction). In such arrangement the scrolling is determined directly from the roll and pitch rotations, so that any tilt changes along the axis perpendicular to the plane of the screen view (yaw axis) may be ignored or used for optional user commands like zooming or control functions.

Various other techniques to translate absolute tilt changes and/or movements in real three dimensional space onto the two dimensions of the screen view are possible, and they can be employed with the present invention. In some embodiments, the sensor may not be aligned with the plane of the screen view 42 so the sensor pitch, roll and yaw are mapped into the horizontal and vertical axes for scrolling.

Figure 3:
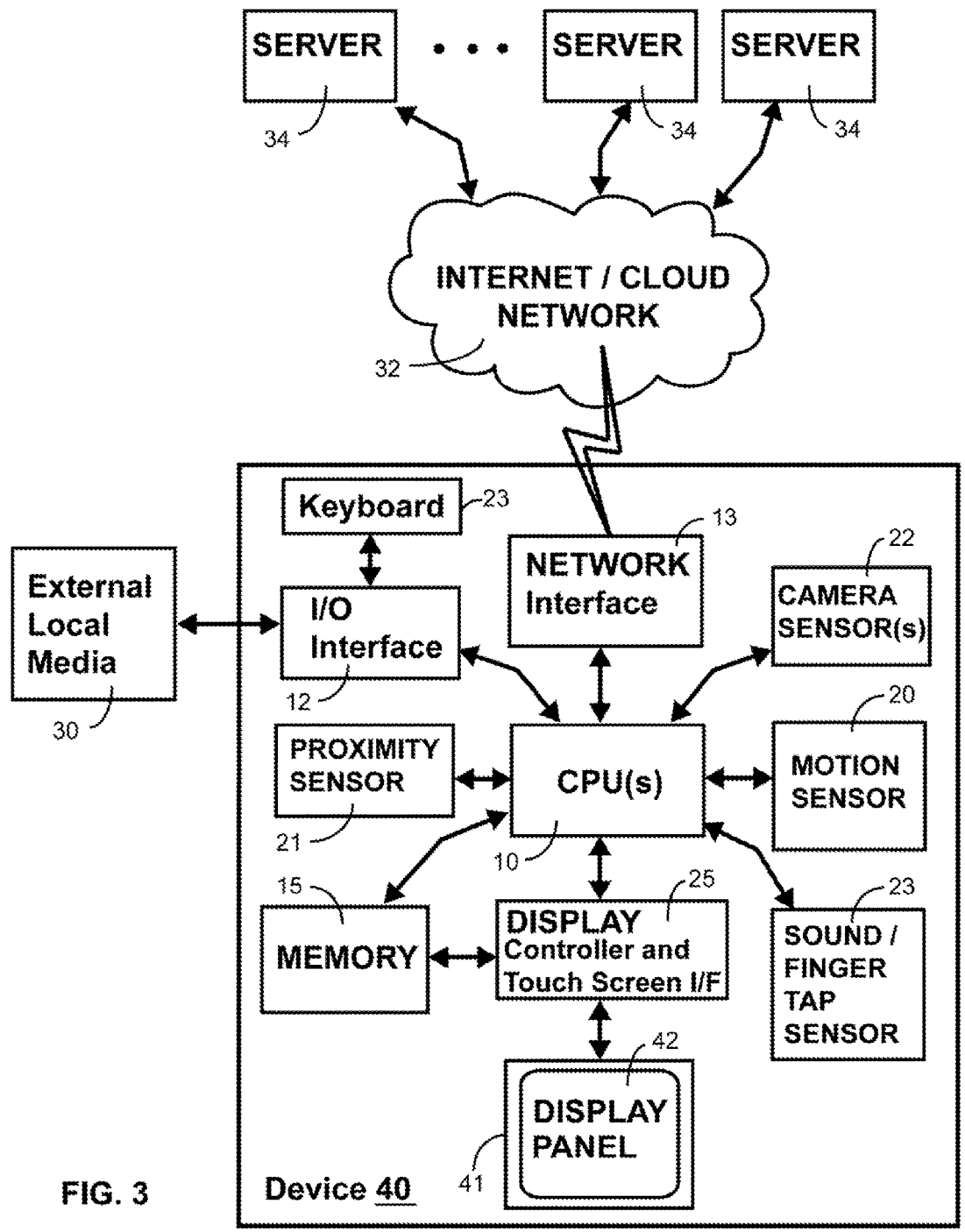
FIG. 3 is a block diagram illustrating an electronic device having a screen and tilt-based view navigation in accordance with some embodiments.

FIG. 3 discloses an electronic device 40 in accordance to some embodiments of the present invention. The processor 10 provides the processing and control means required by the system, and it comprises one or more Central Processing Units (CPU). The CPU(s) in small electronic devices are often referred to as the microprocessor or micro-controller. The processor 10 uses the memory subsystem 15 for retaining the executable program, the data and the display information. In general, the memory subsystem 15 is a tangible and/or non-transitory computer-readable storage media for storing computer-executable instruction or data structures. A motion sensor system 20 interfaces with the processor 10 to provide ballistic data relating to the movements and rotations (tilt changes) of the device made by the user. The ballistic data can be used by the micro-controller to scroll (or navigate) the screen view 42 over the contents view. Optionally, one or more camera sensors 22 may be employed to determine the tilt/movements of the device relative to the surrounding, and to determine where the user head (eyes and the line of sight) is relative to the device's screen.

A display controller module 25 controls the display panel module 41 in accordance with a program executed by the processor 10 and further interfaces with the memory subsystem 15 for accessing the contents view. The processor 10 determines which portion of the contents view is shown in the screen view 42. The display controller 25 may include local graphic memory resources. The display panel module 41 may be optionally equipped with touch screen interface to receive user's touch gestures. In such embodiments the display controller 25 provides the processor 10 with the touch screen gestures performed by one or more fingers on the display panel. When the screen view stretches from one side of the device to the other, the touch sensing area may be extended beyond the boundaries of the screen view, so that the device can respond to user touches on the side of the device's case.

The motion sensor 20 detects rotational movements (or tilt gestures) along at least two generally perpendicular axes to measure changes in the horizontal and vertical tilt of the device relative to a baseline tilt captured at the start of the scrolling. The tilt changes are used by the processor 10 to determine the amount and direction of the scrolling of the screen view 42 over the contents view.

There are many types of motion sensors, including gyroscopes, cameras, accelerometers, magnetic, mechanical, background radio direction sensors, and more. Camera rotation sensors are based on one or more cameras that are mounted on the device 40 and associated with vision analysis to determine movements and rotations. Such camera sensor system may operate on the visible light range or on the infra red range of the spectrum. The motion sensor system may comprise an assembly of one or more sensors of different types, with special "sensor fusion" algorithm designed to improve the accuracy. Often, the motion sensor 20 includes built in computing elements to perform the 'fusion' algorithm. For example, a 6-degree-of-freedom sensor, which comprises a combination of a 3-axis accelerometer and 3-axis gyroscope can be used to distinguish between rotational and movement data and provide more precise view navigation. It can also use accelerometer data to compensate for a gyroscope drift. Complex sensors are useful but are not a must for implementing the present invention. The embodiments described here can be implemented with all rotation sensors.

To further reduce the overall system cost, the implementation can be made using only a single low-cost tri-axis accelerometer (also known as a gravity sensor or a G-sensor). This sensor is available in most modern hand held devices. In such an implementation, the acceleration readings along the X,Y,Z axes are converted into rotational readings along two perpendicular axes, e.g. the device's roll and pitch axes. It is well known in the art how to perform such a conversion, providing reasonable accurate roll and pitch results when the device has no lateral movements and the accelerometer resolves only the gravity of Earth. However, we have found that intuitive lateral movements in such a configuration are converted to virtual rotations. For example, lateral movement to the right may be translated to a roll axis rotation to the right. These lateral movements are still very useful to navigate the screen view because the scrolling process works in a closed control loop. This loop includes the user that moves the device, the translation of device lateral movements into virtual tilt changes, and the observed view navigation. Thus the user may combine lateral and rotation movements to scroll to the target area of the contents view.

The motion sensor 20 can be used to detect movement or rotation commands to activate and deactivate motion-based scrolling operation, as described in my "RotoView" patents cited above. An optional proximity sensor 21 measures the distance between the screen view 42 and the user's eyes along a Z-axis perpendicular to the surface of the screen view. We refer in the present application to this distance as the "Z-distance".

The system may employ camera sensors 22 that can work with the motion sensor 20 or to be used exclusively instead of the motion sensor. One or more camera sensor may be used, and it may be installed on the face of the device 40 and/or on the back of the device. The camera sensors may use regular light or special waveform. A useful arrangement may include four camera sensors mounted on the face of the device, near the four corners. Such sensors can detect absolute motion/tilt of the device relative to the surrounding and even to find the 3-dimensional direction of the user's head (and therefore her eyes and line of sight) relative to the face of the screen. In some embodiments, the camera sensors 22 can also measure the Z-distance using common triangulation techniques.

In some embodiments, the device 40 may include a sound/finger tap sensor 23 that may detect finger tap commands by the user, as disclosed in my U.S. Pat. Nos. 6,466,198 and 6,933,923. The user may directly tap the enclosure of the device, for example by tapping with the finger/s at the back of the device held by one hand. In other embodiments, the user of a wearable device like a smart watch may tap two or more fingers together of the hand wearing the watch to generate distinctive action commands. In such instance, the sound and vibrations of the finger tapping are conducted by the hand itself until it reaches the finger tap sensor within the smart watch enclosure.

The sound/finger tap sensor 23 may comprise a microphone and digital signal processing (DSP) interface to filter legitimate finger tap sounds and notify the processor 10. The DSP action may be performed by the processor 10, or may be performed by a built in microcontroller of a "smart" sound sensor. In other embodiments, the finger tap sensor may use a vibration detector like a piezoelectric finger tap sensor.

In some embodiments, the processor 10 performs a sensor "fusion" between the finger tap sensor 23 and the motion sensor 20 to validate the finger tap commands. It correlates the sound (or vibrations) input from the finger tap sensor 23 to corresponding vibration captured by the motion sensor 20. This arrangement can distinguish between a finger tap sound made by the hand wearing or holding the device and another finger tap sound made by the other hand.

The contents shown on the display may reside in the memory 15 or it can be acquired from remote servers 34 in the cloud or via the internet 32. The connection to the internet or cloud is performed via an optional network interface 13 module of device 40. Actual data flows can be via radio frequency or hardwired to a network plug. Alternatively, contents can be acquired from external local media devices 30 that are connected via an optional input/output interface module 12 of the device. The input/output interface module 12 may also connect to optional keyboard 23 (or individual buttons) to accept user commands and input.

It should be apparent to a person skilled in the art that many variants of the block elements comprising the block diagram of FIG. 3 can be made, and that various components may be integrated together into one or more VLSI chips. The processor 10 can optionally access additional user interface resources such as a voice command interface and a keyboard/joystick interface. Another interface resource may be a visual gesture interface, which detects a remote predefined visual gesture (comprising predefined movements of the hand, the fingers or the entire body) using a camera or other capture devices.

Various other components are typically used in device 40 that are not shown explicitly in FIG. 3 but their existence should be recognized by a person skilled in the art. These components may include power/battery systems, RF circuitry, Audio circuitry and other modules.

Referring to FIG. 1, the device uses the first rotation axis 60 set along the roll axis of the device to translate the device's tilt changes along arrow 64 into rightwards horizontal scrolling of the screen view 42 over the contents view 50. Note that arrow 64 is rotated clockwise to cause the rightwards horizontal scrolling when looking at the roll axis from the bottom 44 to the top. In this application, we arbitrarily consider clockwise rotation as an increase in tilt, and counter-clockwise rotation as a decrease in tilt. I call this translation of rotation direction to scrolling direction "Mirror Style" as it mimics the change of a mirror view when it is rotated along arrow 64. Since it is customary to measure the scrolling distance from left to right (for the 'x' coordinate of the screen view 42 within the contents view 50), the "Mirror Style" horizontal scrolling increases the 'x' coordinate of the screen view when rotation is clockwise (screen view moves left to right). Some users may prefer a reversed response, in which rotating the device along arrow 64 will cause leftwards horizontal scrolling. I call that translation of scrolling direction "Window Style". Device settings allow the user to select his preferred style of scrolling direction.

In FIGS. 2A and 2B the second rotation axis 62 set along the pitch axis of the device is used to translate the device's tilt changes along arrow 68 into downwards vertical scrolling (or upwards if "Window Style" is selected). Measuring vertical tilt rotation is done viewing the pitch axis 62 from the left side 46 of the device. Note that arrow 68 is rotating clockwise to cause the downwards vertical scrolling.

With smart watches, it is easier to control tilt changes by rotating the wrist, which is aligned along the pitch axis of the watch. Thus rotating the wrist in the clockwise direction of arrow 68 scrolls the icons downwards, allowing the user to bring the desired action icon 4 to the center of the watch screen view 42. In some embodiments, the user may select the action icon by tapping the fingers of the hand wearing the watch, using the sound/finger tap sensor 23 of FIG. 3. The user may use double tapping (or other tapping combination) to start and dismiss the selection process, and a single finger tapping to select the icon scrolled to the center of the screen.

The present invention improves the user's experience during constrained horizontal scrolling (e.g. FIG. 1) or during constrained vertical scrolling (e.g. FIGS. 2A and 2B). It provides an Augmented Tilt Control mode that uses the tilt data in the non-scrolling direction (vertical or horizontal tilt data respectively) to augment the scrolling by modifying at least one scrolling control parameter as described below.

In some embodiments, the motion-based view navigation system may respond to lateral movements. When using a complex 6-degree-of-freedom sensor that includes an accurate gyroscope, it is possible to use only the gyroscope rotational data for scrolling control and ignore the lateral movement data. When using a low-cost solution with only a tri-axis accelerometer as described above, arrow 66 represents horizontal lateral movement that may be used to scroll the screen view to the right. Similarly, arrow 70 represents vertical lateral movement that may be used to scroll the screen view down.

When the entire contents view is shown in the screen view, we say that the contents view is not magnified (or that it is zoomed out). When the screen view shows only a portion of the contents view during the view navigation process (scrolling), we say that the contents view is magnified (or zoomed in). The horizontal magnification is defined as the ratio MagX=a/b of the width (a) 78 of the contents view divided by the width (b) 72 of the screen view. Similarly, the vertical magnification is defined as the ratio MagY=c/d of the height (c) 74 of the contents view divided by the height (d) 76 of the screen view. For constrained horizontal scrolling, MagX>1 and MagY<=1. For constrained vertical scrolling, MagX<=1 and MagY>1. Because the screen view 42 and the contents view 50 are generally represented by bounding rectangles that are often not similar, the horizontal magnification and vertical magnification are usually different. In cases where the contents view is dynamically downloaded to the device or changed programmatically during the scrolling operation, the magnification value changes in response to changes in the geometry of the changing contents view.

The device's tilt changes along the horizontal direction (e.g. around the roll axis 60) are measured relative to a horizontal baseline tilt of the device taken at the start of the scrolling. The device's tilt changes along the vertical direction (e.g. around the pitch axis 62) are measured relative to a vertical baseline tilt of the device taken at the start of the scrolling. Throughout this application we define tilt changes or rotation changes performed by the user in order to scroll the device as relative tilts. The current (i.e. the currently measured value) relative horizontal tilt is defined as the current horizontal tilt of the device minus the horizontal baseline tilt. The current relative vertical tilt is defined as the current vertical tilt of the device minus the vertical baseline tilt. It should be noted that the difference between two relative tilts in the same direction is equal to the difference between the two actual tilt measurements since both results subtracts the same baseline tilt. Therefore, my election to use relative tilts in this application is for convenience only, without the loss of generality.

In some embodiments, the processor can perform scrolling in both Proportional and Dynamic Scroll modes. In Proportional Scroll mode, the processor can set the screen view position over the contents view directly from the relative tilt. To achieve this, each screen position on the contents view is mapped to a certain relative tilt value. This mapping is often proportional so that the current screen position at the start of scrolling is naturally mapped to zero relative tilt, and the screen positions at the edges of the contents view are mapped to max and min values within the relative tilt range. This is why we refer to this mode of view navigation as Proportional Scroll mode, although my U.S. Pat. No. 9,181,760 teaches variations of Proportional Scroll where the mapping from relative tilt to screen position is not linear. The Proportional Scroll must use a preset rotation range that allows full scrolling of the contents view from edge to edge. For example, the contents view 50 of FIG. 1 may be assigned a rotation range of 30° for the horizontal scrolling from the left edge 52 to the right edge 54.

Another flexible approach to perform scrolling based on tilt changes is to convert the tilt changes into a corresponding rate (or speed) of scrolling, as taught by my "RotoView" U.S. Pat. Nos. 6,466,198 and 6,933,923 cited above. We will refer in this application to this mode of motion-based view navigation as Dynamic Scroll mode. Dynamic scroll mode may use a multiplicative scale factor k to globally increase or decrease the actual scrolling speed. Thus, the current scrolling speed is equal to a scrolling rate computed from the relative tilt multiplied by such scale factor k. Thus, the scale factor k may act as a scrolling control parameter that may modify the global scrolling speed intensity.

Figure 4A:
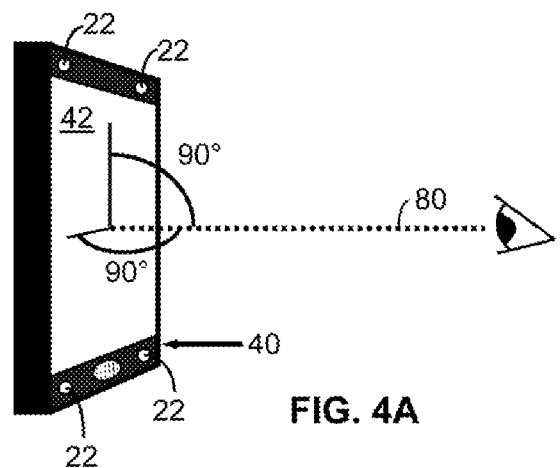
FIG. 4A shows the optimal viewing condition when the display is perpendicular to the line of sight.
Figure 4B:
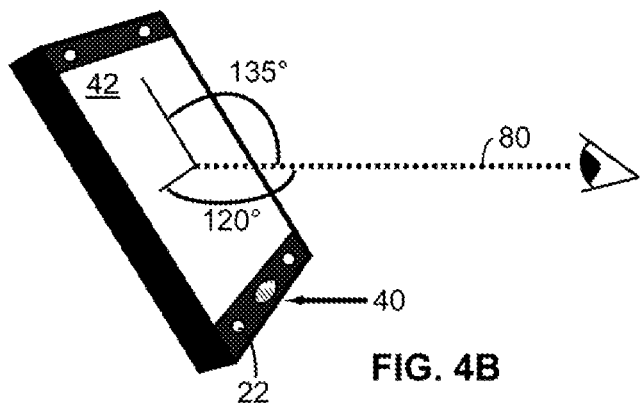
FIG. 4B shows a bad viewing condition when the display is held at an oblique angle to the line of sight.

The user gains the best viewing experience when the screen surface is held perpendicular to her eyes as shown in FIG. 4A. When using Proportional Scroll, if the user starts the scrolling holding the device at the optimal viewing position of FIG. 4A, scrolling to the edge of the contents view 50 is likely to result in the viewing position of FIG. 4B. Clearly, FIG. 4B shows that the device is held at a sharp oblique angle relative to the user's line of sight 80, creating a difficult viewing condition. Since Dynamic Scroll uses rotation changes to determine the speed and direction of the scroll, the device is returned to the initial optimal orientation of FIG. 4A at the end of the scroll. Hence Dynamic Scroll is very useful when the contents view is highly magnified, while Proportional Scroll mode is more useful for smaller magnifications.

Figure 5A:
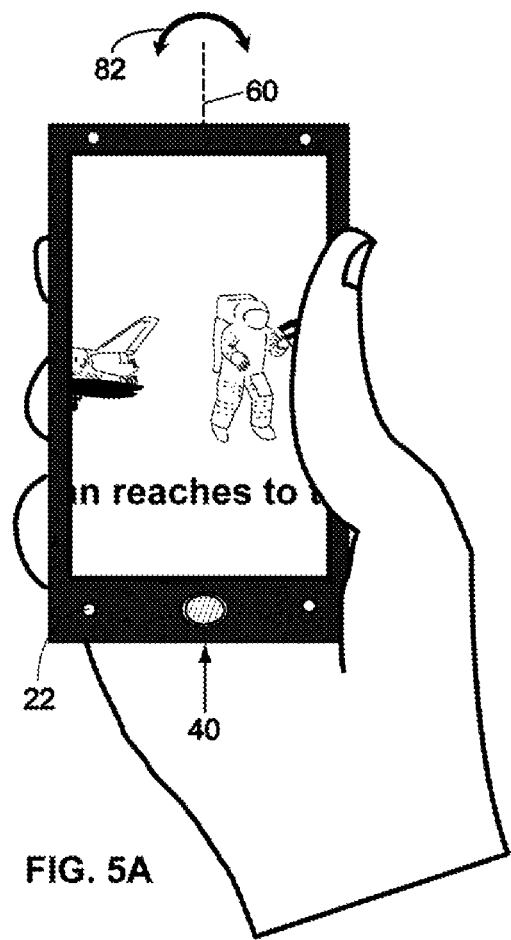
FIG. 5A illustrates a constrained horizontal scrolling in some embodiments of the present invention where the device is held close to being perpendicular to the face of the earth.
Figure 5B:
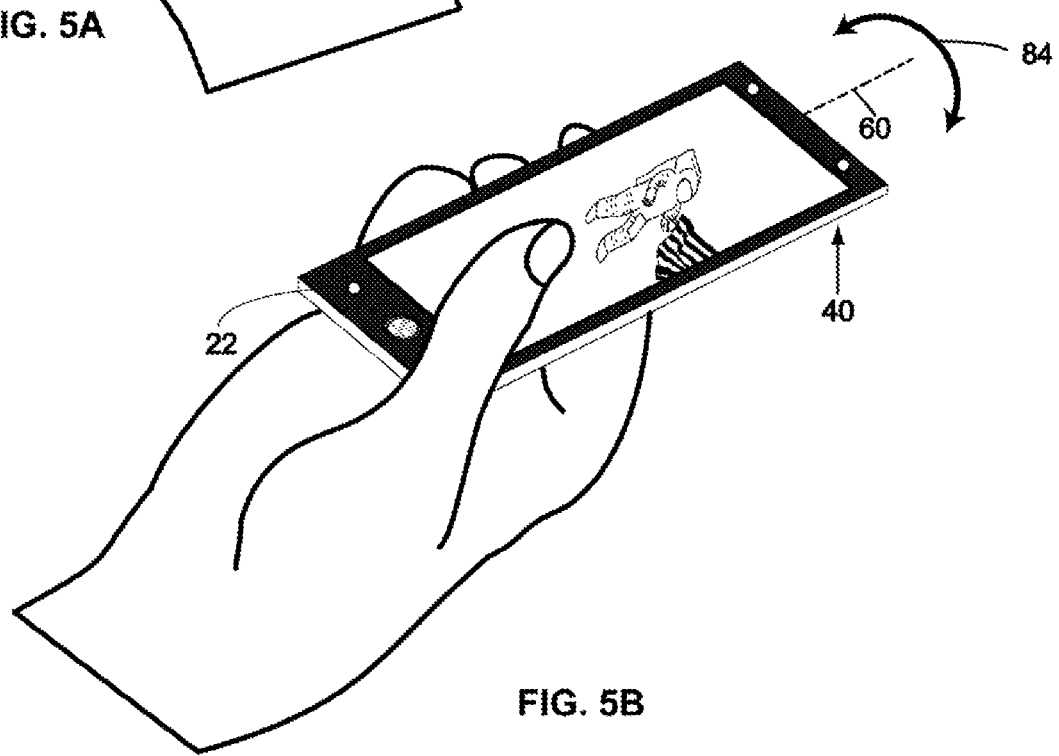
FIG. 5B illustrates a constrained horizontal scrolling in some embodiments of the present invention where the device is held close to being parallel to the face of the earth.

FIG. 5A shows a device 40 being held up compared to the face of the earth while FIG. 5B shows a device that is held down relatively to the face of the earth. As mentioned, we measure all relative pitch tilts based on clockwise rotation along the pitch axis when the rotation is observed looking from left end to right end. Therefore, the relative pitch tilt of FIG. 5B is positive, and it is larger (namely, more clockwise rotation) than the negative relative pitch tilt in FIG. 5A. Determination of the line of sight 80 relative direction to the face of the screen view 42 is very important. When using the motion sensor 20 of FIG. 3 that is based on kinetic sensors (accelerometer, gyroscope, attitude or magnetic sensors), the relative direction of the line of sight can only be approximated, since there is no actual measurement of the direction to the user's eyes. The device can determine the relative direction of the line of sight more accurately in a configuration where the device includes camera sensors 22. It is common to place four camera sensors in the front corners of the device as shown in FIGS. 4 and 5 for accurate triangulation to find the direction to the user's eyes. We may infer that FIG. 5A is more likely to be in the optimal viewing condition of FIG. 4A while FIG. 5B is more likely to incur an oblique viewing angle as shown in FIG. 4B.

In some embodiments of constrained horizontal scrolling, the horizontal rotation range 82 (when the device is held in the position of FIG. 5A) may be automatically set to be lower than the horizontal rotation range 84 (when the device is held in the position of FIG. 5B). In such embodiments, the Augmented Tilt Control mode stays active throughout the scrolling process.

Figure 6A:
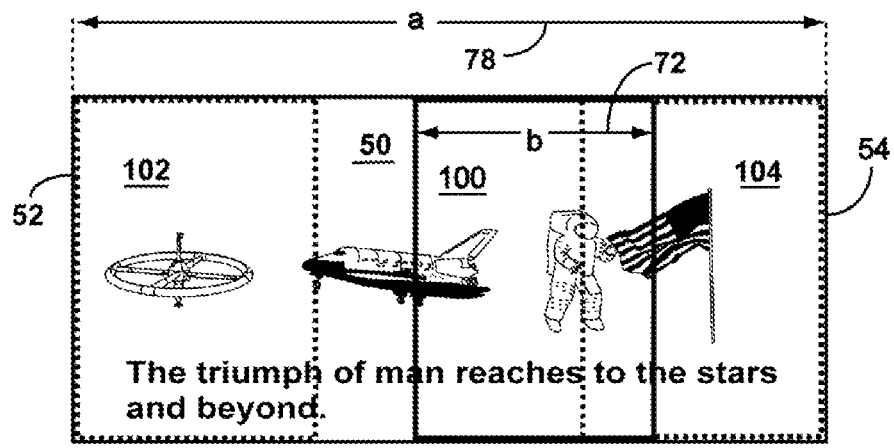
FIG. 6A shows several screen view positions taken in the constrained horizontal scrolling example of FIG. 1 when the scrolling is performed using the Proportional Scroll mode.

FIG. 6A illustrates three screen view positions over the contents view 50 during the constrained horizontal Proportional Scroll example shown in FIG. 1. At the start of the scrolling process, the screen view is placed at an arbitrary screen position 100, which is marked in FIG. 6A with a bold line rectangle. In this example, the initial arbitrary screen position 100 is taken directly from the screen position illustrated in FIG. 1. When the device is tilted counter-clockwise along the roll axis 60 it reaches screen view position 102 at the left edge 52 of the contents view 50. When the device is tilted clockwise along the roll axis it reaches screen view position 104 at the right edge 54 of the contents view. Note that this relation between the horizontal tilt direction to the scrolling direction follows the "Mirror Style" and can be reversed if the "Window Style" setting is chosen.

Figure 6B:
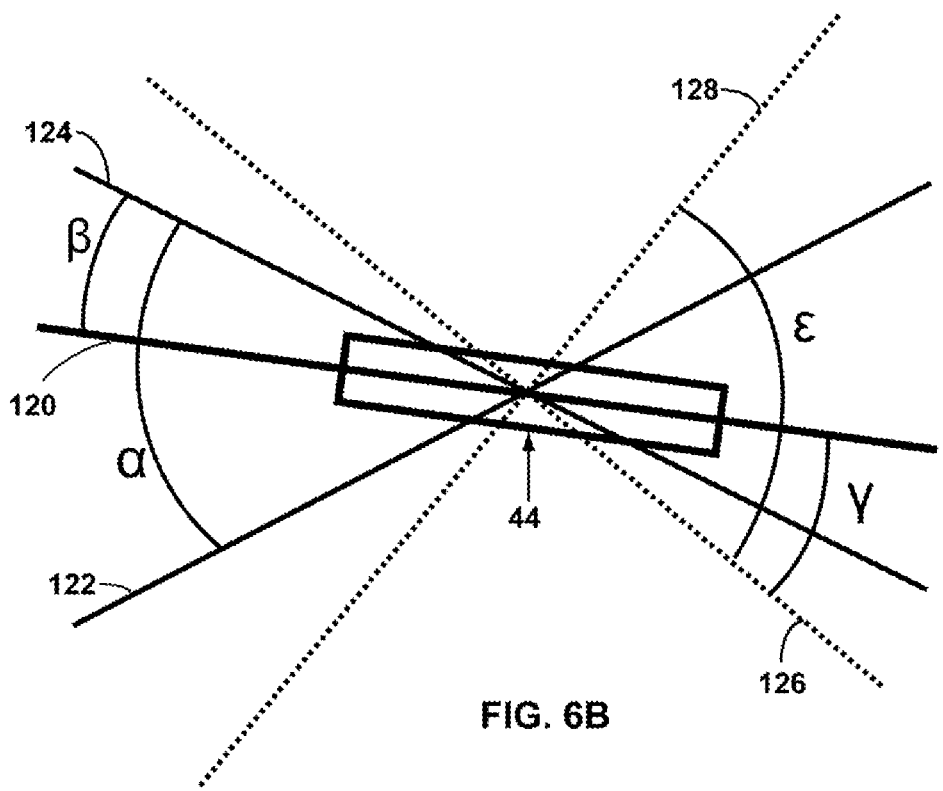
FIG. 6B illustrates the horizontal tilts of the device corresponding to the screen view positions of FIG. 6A with two rotation angle ranges.

FIG. 6B illustrates the horizontal rotations during the horizontal Proportional Scroll of FIG. 6A as seen from the bottom edge view 44 of the device 40 (see also FIG. 1). The arbitrary tilt of the device 40 along the roll axis at the start of the Proportional Scroll example is captured as the horizontal baseline 120. The device is tilted counter-clockwise to line 122 relative to the horizontal baseline 120 to cause the screen view 42 to scroll to screen position 102 at the left edge 52 of the contents view. Similarly, the device is rotated clockwise to line 124 to scroll the screen view to screen position 104 at the right edge 54 of the contents view. The angle β formed between lines 124 and 120 indicates the relative horizontal tilt needed to scroll from initial screen position 100 to the screen position 104 at the right edge of the contents view. The angle α formed between lines 122 and 124 defines the horizontal rotation range φ during the Proportional Scroll mode.

The horizontal rotation range φ is a fundamental parameter during Proportional Scroll mode as all valid screen view positions along the horizontal scrolling range are mapped into the horizontal rotation range. Please refer to the detailed description in my U.S. Pat. No. 8,675,019 and in my U.S. patent application Ser. No. 14/873,448. While scrolling animation may be introduced to improve the user experience, and even to introduce special effects like edge bounce back, the final screen view position after the animation is completed still generally follows the mapping from the relative horizontal tilt.

Since the user gains the best viewing experience when the screen surface is perpendicular to her eyes, it is desirable to set the default rotation range to the lowest value that still allows convenient control by the user. When the horizontal scrolling range is large, setting a low value for the rotation range requires that very small rotations are translated to large scrolling distances. As a result, scrolling under these conditions is less smooth and sometimes unpleasantly jumpy. Some embodiments may provide filtering for the sensor data to reduce the jumpy behavior of the rotation measurements. One needs to be aware that strong filtering tends to cause a noticeable delay in the scrolling response.

In some embodiments, scrolling starts with a default (or user preset) rotation range value and allows the user to change this value dynamically during the scrolling activity by creating tilt changes in the non-scrolling direction. In the constrained horizontal scrolling example of FIGS. 1 and 6A, the non-scrolling direction is the vertical direction, so that the tilt changes along the pitch axis 62 are used for the augmented tilt control of the scrolling. In the vertical scrolling example of FIGS. 2A and 2B, the tilt changes along the roll axis 60 are used for the augmented tilt control of the scrolling.

When discussing a constrained unidirectional scrolling in this disclosure without specifying the horizontal or vertical direction, it is convenient to designate generic tilt names— the primary tilt and the secondary tilt. For constrained horizontal scrolling (FIGS. 1 and 6A), the horizontal tilt is therefore the primary tilt and the vertical tilt is the secondary tilt. For constrained vertical scrolling (FIGS. 2A and 2B), the vertical tilt is the primary tilt and the horizontal tilt is the secondary tilt.

Augmented tilt control of the scrolling by the secondary tilt may be performed continuously or during a control period when the Augmented Tilt Control mode is activated by the user or initiated automatically when the scrolling starts. When the Augmented Tilt Control mode is continuously kept on, as described with the embodiments of FIGS. 5A and 5B, the continuous rotation range modification seeks to improve the user experience during the scrolling process. The performance tradeoff is that when the rotation range is made small to improve (reduce) the angle of the viewing line of sight, the smaller rotation range increases the scrolling distance per each tilt change. The increased scrolling distances make it harder to achieve a refined scrolling.

When the augmented tilt control of scrolling is performed during a control period when the Augmented Tilt Control mode is active, the system allows the user to change the rotation range to fit his immediate need. Sometimes coarse scrolling (achieved with reduced rotation range) is required at the start of scrolling of large contents view (long web site, text file, or highly magnified image) followed by a refined scrolling (achieved with increased rotation range). The final rotation range set by the time the Augmented Tilt Control mode is deactivated replaces the default rotation range for the remainder of the scrolling operation.

When the rotation range in FIG. 6B is increased, say from α to ε, the new rotation boundary line 128 replaces the previous boundary line 122. Line 128 shows the horizontal tilt of the device relative to the baseline 120 when the device is fully rotated counter clockwise to screen position 102. Similarly, rotating clockwise to reach screen position 104 yields a new boundary line 126 instead of the previous boundary line 124. The angle γ formed between lines 126 and baseline 120 indicates the relative horizontal tilt needed to scroll from initial screen position 100 to the screen position 104 at the right edge 54 of the contents view 50.

Figure 6C:
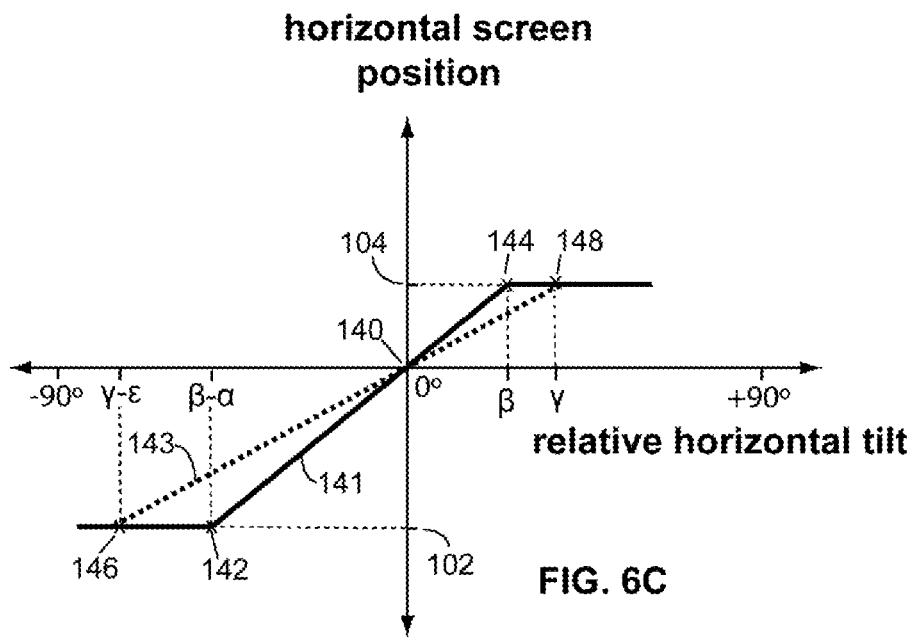
FIG. 6C shows the Proportional Scroll mode linear response curve relating the relative horizontal tilts of FIG. 6B to the screen view positions of FIG. 6A.

FIG. 6C depicts a graph showing the horizontal screen position relative to the relative horizontal tilt for the Proportional Scroll example of FIG. 6A. When the Proportional Scroll begins, the current horizontal tilt of the device is captured as the horizontal baseline. This initial horizontal tilt has a relative horizontal tilt equal to 0° at the graph origin 140. The graph origin 140 corresponds to the initial screen position 100 in FIG. 6A. Following the "Mirror Style" setting of this example, the relative horizontal tilt increases when the device is rotated clockwise and it decreases when the device is rotated counter clockwise. Notice that the horizontal screen position is linearly related to the relative horizontal tilt between graph points 142 and 144 by the bold graph line 141. In some embodiments of the present invention the actual scrolling to the mapped screen position may include various animation effects, such as a spring bounce back at the edges or some other smoothing animations.

At graph point 142, the device is tilted to line 122 of FIG. 6B and the screen view reaches position 102 at the left edge 52 of the contents view 50. The corresponding relative horizontal tilt for graph point 142 is β-α. If the relative horizontal tilt is further decreased (by continuing to rotate the device counter clockwise), the screen view position remains at 102 (even after the optional performance of a bounce back animation) as it is stopped at the left edge 52 of the contents view. At graph point 144, with a relative horizontal tilt equal to β, the device's horizontal tilt reaches line 124 of FIG. 6B, corresponding to screen view position 104 at the right edge 54 of the contents view. The screen view position remains at 104 when the device is further rotated clockwise beyond the line 144.

Changing the secondary tilt (along the non-scrolling vertical direction) changes the horizontal rotation range φ as described below in some embodiments of the augmented tilt control of the present invention. When the horizontal rotation range φ is increased from α to ε, the dotted graph line 143 in FIG. 6C sets the relative horizontal tilt at graph point 148 to the right edge screen position 104, and it sets the relative horizontal tilt at graph point 146 to the left edge screen position 102.

Figure 6D:
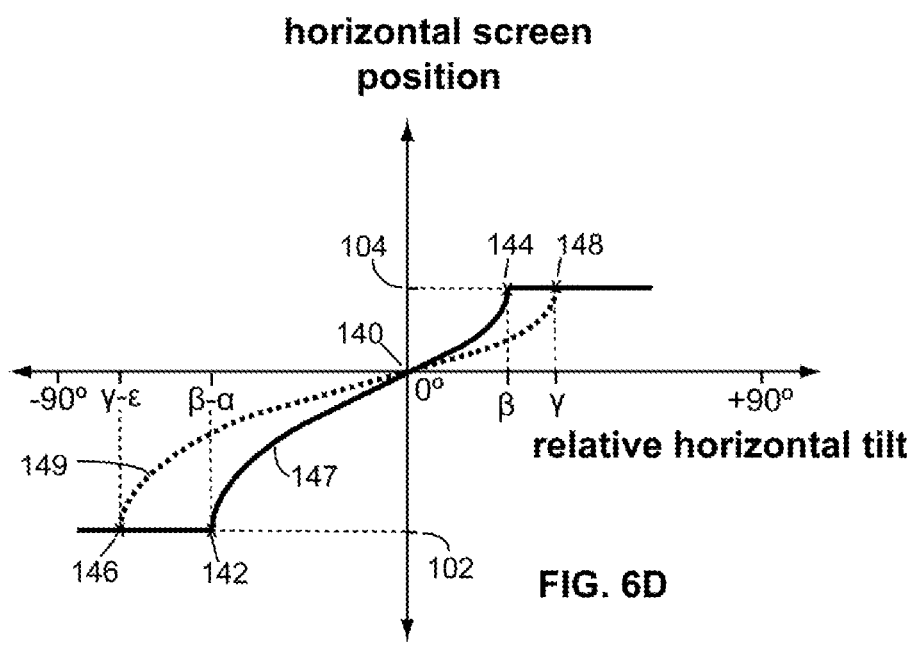
FIG. 6D shows an alternative non-linear response curve relating the relative horizontal tilts of FIG. 6B to the screen view positions of FIG. 6A.

FIG. 6C illustrates a linear relation between the relative horizontal tilt (the primary relative tilt) and the horizontal screen position. As discussed in the parent application (see FIG. 15 of Ser. No. 14/340,476), the relation between the primary relative tilt and the screen position can be non-linear. FIG. 6D demonstrates an alternative non-linear graph for the Proportional Scroll example of FIG. 6A. The graph end points use the same numeral references as those for the graph of FIG. 6C to relate the same tilt lines of FIG. 6B. Here again the bold graph line 147 in FIG. 6D controls the screen position when the initial rotation range φ is α. The dotted graph line 149 controls the screen position when the rotation φ is increased from α to ε.

Figure 7A:
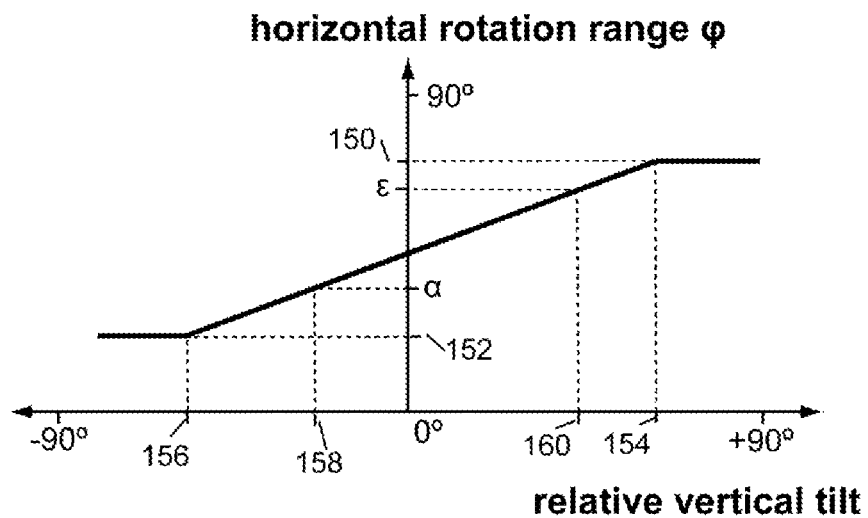
FIG. 7A illustrates a linear response curve suitable for an augmented tilt control of the constrained horizontal scrolling using the Proportional Scroll mode in response to changes in the relative vertical tilt.

FIG. 7A provides a response curve mapping changes in the relative vertical tilt (the secondary relative tilt) to changes onto the horizontal rotation range φ for the embodiments disclosed in FIGS. 5A and 5B. The relative vertical tilt is measured relative to a vertical baseline tilt recorded at the start of scrolling using clockwise rotation. Referring back to FIGS. 5A and 5B, we assume that the vertical baseline tilt was recorded when the device is held at a tilt that is somewhere in between the vertical tilt shown in FIG. 5A and the vertical tilt shown in FIG. 5B. The vertical tilt in FIG. 5A creates a negative vertical relative tilt at 158, since the device is vertically rotated counter-clockwise relative to the vertical tilt baseline. The vertical tilt in FIG. 5B registers a positive vertical tilt at 160, since the device is vertically rotated clockwise relative to the vertical tilt baseline. Our experiments with "RotoView" technology indicated that the user can tolerate larger horizontal rotation ranges when the device is held in the vertical tilt shown in FIG. 5B as compared to the vertical tilt in FIG. 5A. This is because the actual horizontal range perceived by the user is reduced due to the more oblique vertical angle created by the vertical tilt of FIG. 5B. For example, our experiments confirmed that a rotation range of about 45° that is somewhat uncomfortable with the vertical tilt of FIG. 5A may be acceptable to the user when the vertical tilt is as shown in FIG. 5B. Therefore, in some automatic augmented tilt control embodiments that seek to maximize the rotation range to provide finer horizontal scrolling, we assign a larger value ε for the horizontal rotation range φ for the relative vertical tilt 160 of FIG. 5B, and we assign the smaller value α for the horizontal rotation range φ to relative vertical tilt 158 of FIG. 5A. FIG. 7A illustrates a linear response curve that maps a maximum horizontal range 150 to the relative vertical tilt 154 and a minimum horizontal rotation range 152 to the relative vertical tilt 156. The relative vertical tilts 154 and 156 define the effective relative vertical tilt range for the augmented tilt control. The response curve of FIG. 7A illustrates the case when the device is held at a vertical tilt between the vertical tilts of FIGS. 5A and 5B when the scrolling starts. The response curve is shifted to accommodate any other starting vertical tilt. For example, if the scrolling starts with a vertical tilt similar to FIG. 5B, then FIG. 7A is shifted left so that a relative vertical tilt of 0° maps the horizontal rotation range φ to ε.

Figure 7B:
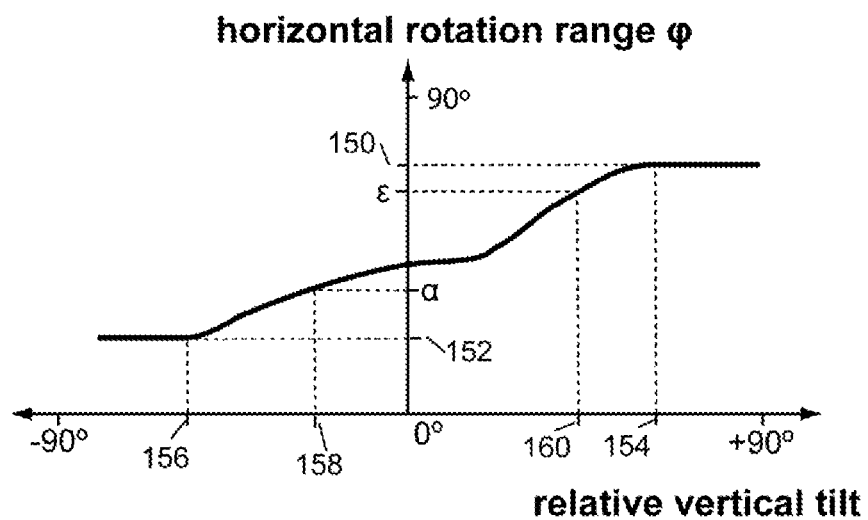
FIG. 7B illustrates a non-linear response curve for an augmented control of a constrained horizontal scrolling in response to changes in the relative vertical tilt.
Figure 7C:
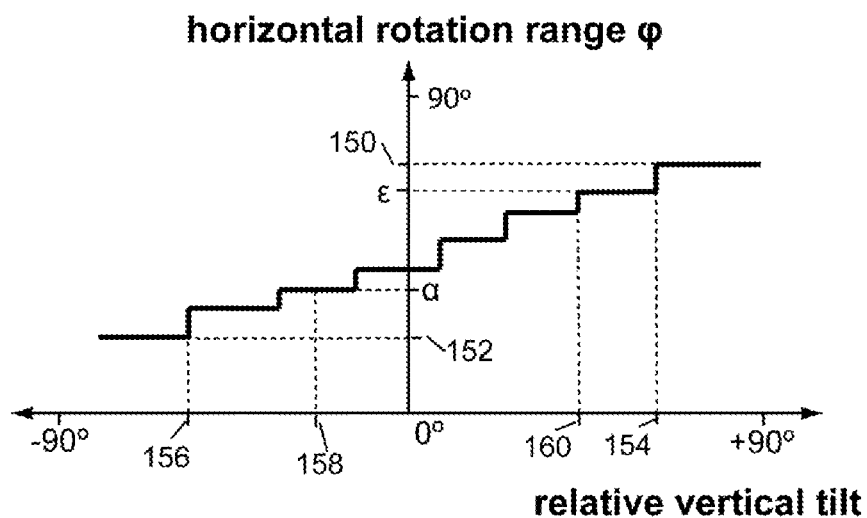
FIG. 7C demonstrates a response curve comprising a set of discrete values for an augmented tilt control of a constrained horizontal scrolling in response to changes in the relative vertical tilt.
Figure 7D:
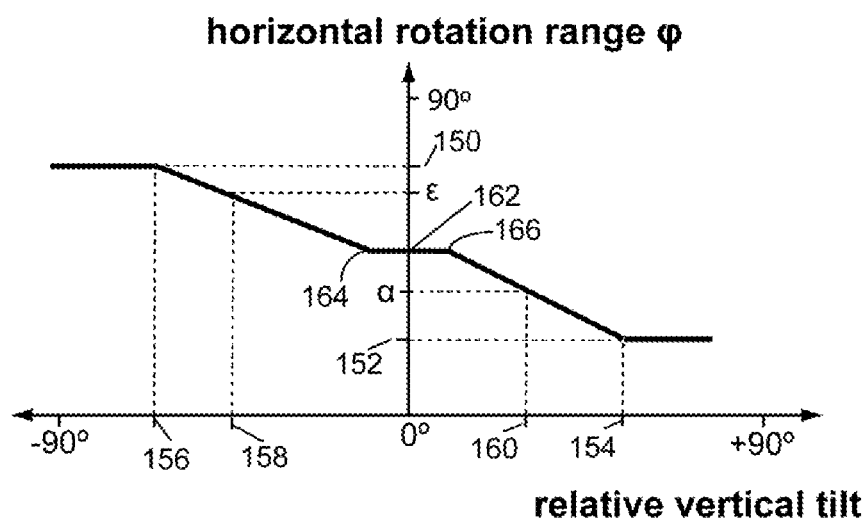
FIG. 7D illustrates a different linear response curve for an augmented tilt control of a constrained horizontal scrolling in response to changes in the relative vertical tilt.

FIGS. 7B, 7C and 7D show other possible response curves that may be uses in some embodiments where the Augmented Tilt Control mode is active only during a control period activated automatically at the start of scrolling or by user's command. FIG. 7B illustrates a non-linear curve where larger changes occur in the area of positive relative vertical tilt values (e.g. FIG. 5B). FIG. 7C demonstrates a discrete response graph where the horizontal rotation range φ is kept constant within segments of the relative vertical tilt range. FIG. 7D demonstrates a different response curve where the larger rotation range values are assigned for negative relative vertical tilts. In the range 162 between graph point 164 and 166 there are no changes in the horizontal rotation range φ, thus providing threshold to eliminate unintended changes. This threshold protected range 162 can be used in the other examples in FIGS. 7B and 7C.

While FIG. 7D has an opposite optimization than FIG. 7A, it may be more useful for constrained vertical scrolling. When used for constrained vertical scrolling, the response curve of FIG. 7D should be understood to have the X axis, the secondary relative tilt, assigned to the relative horizontal tilt (instead of the relative vertical tilt) and the Y axis assigned to the vertical rotation range θ (instead of the horizontal rotation range φ).

Figure 8:
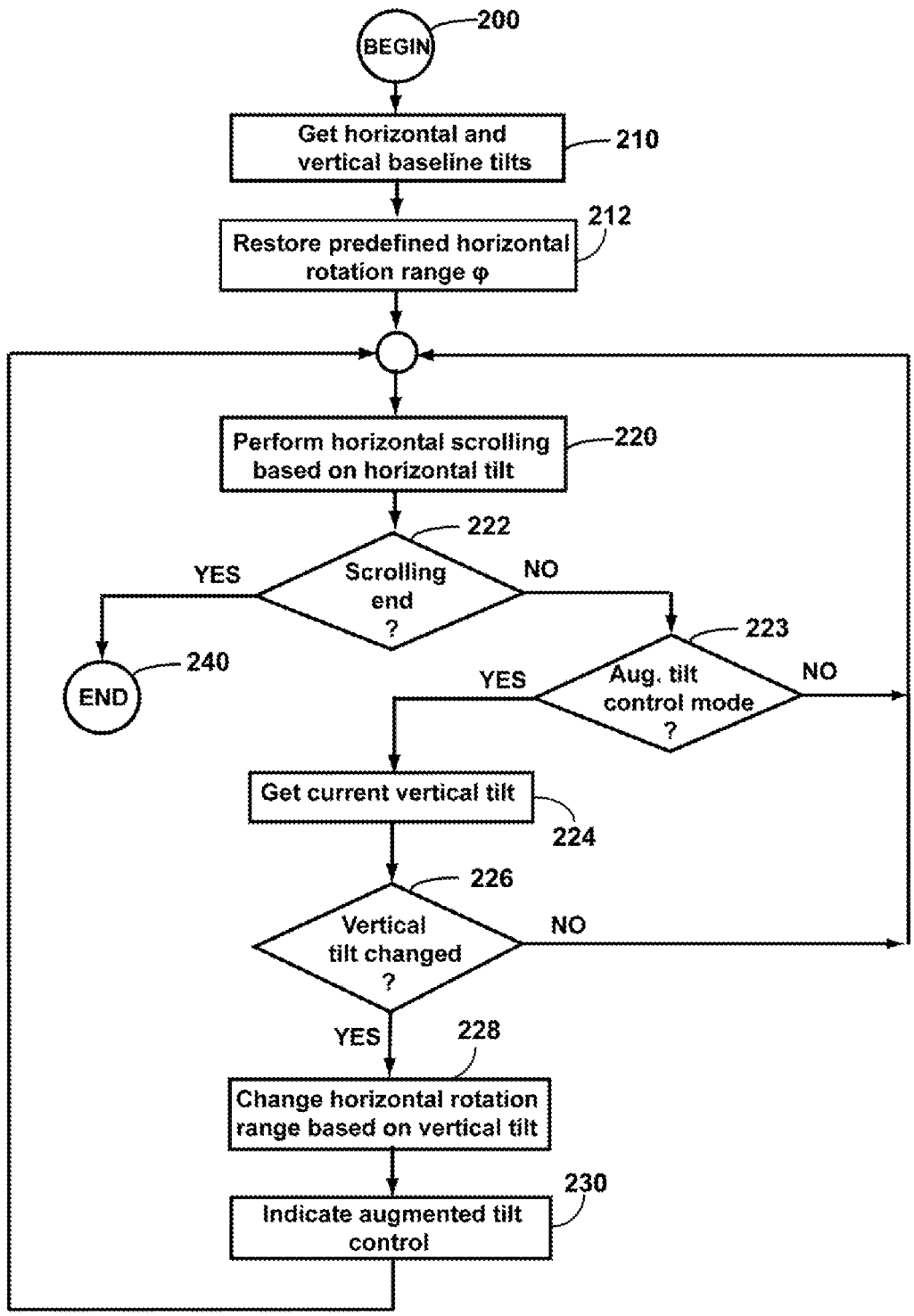
FIG. 8 shows the process flow diagram for the augmented tilt control of the Proportional Scroll mode.

FIG. 8 shows the process flow diagram for the constrained horizontal scrolling of FIG. 6A when it is performed in Proportional Scroll mode in some embodiments. The primary tilt in this case is the horizontal direction, while the secondary tilt, in the vertical direction, augments the scrolling by modifying the horizontal rotation range φ. FIG. 8 may also describe constrained vertical scrolling (e.g. for FIGS. 2A and 2B) that is augmented by horizontal tilt changes, provided that all references to horizontal and vertical directions are swapped. Therefore, for a constrained vertical scrolling, the primary tilt direction is vertical, and the secondary tilt direction is horizontal. When the scrolling starts at step 200, the horizontal and vertical baseline tilts are recorded in step 210. Step 212 restores the predefined horizontal rotation range φ. The predefined value of φ is a default value that may be changed by the user or can be selected automatically for each application from preset values stored in the device settings. The horizontal scrolling is performed in step 220 utilizing the Proportional Scroll mode that uses horizontal rotation range φ.

Decision step 222 checks if the horizontal scrolling is completed (i.e. the user indicates that the scrolling should end and the system returns to the Fixed mode at step 240). If the View Navigation mode is still on, decision step 223 tests if the Augmented Tilt Control mode is active. If the mode is not active, constrained horizontal scrolling step 220 continues. If the mode is active, step 224 measures the current vertical tilt either from the motion sensor 20 (or from the camera sensors 22 or any other tilt sensor), and computes the relative vertical tilt compared to the baseline vertical tilt recorded in step 210. Decision step 226 checks whether the relative vertical tilt has changed. If no change is detected (or if the change is below a threshold value), the loop comprising steps 220, 222, 223, 224 and 226 repeats. If the vertical tilt is changed, step 228 changes the horizontal rotation range φ based on the vertical tilt changes thus modifying the Proportional Scroll mode main parameter. Several examples for the direct relation between the horizontal rotation range φ and the relative vertical tilt were illustrated in FIGS. 7A, 7B, 7C and 7D. In some embodiments, the rotation range may be modified incrementally by back and forth vertical rotations, as described in FIGS. 15A and 15B below.

Step 230 provides an indication to the user that the scrolling parameters are being changed by the augmented tilt control. This indication may use visual, audio or haptic feedback methods. One appropriate visual method is taught in my U.S. Pat. No. 8,675,019 and in my U.S. patent application Ser. No. 14/873,448. The indication may also show when the Augmented Tilt Control mode is active. Step 230 is optional and is not required in all implementations of the present invention.

Figure 9A:
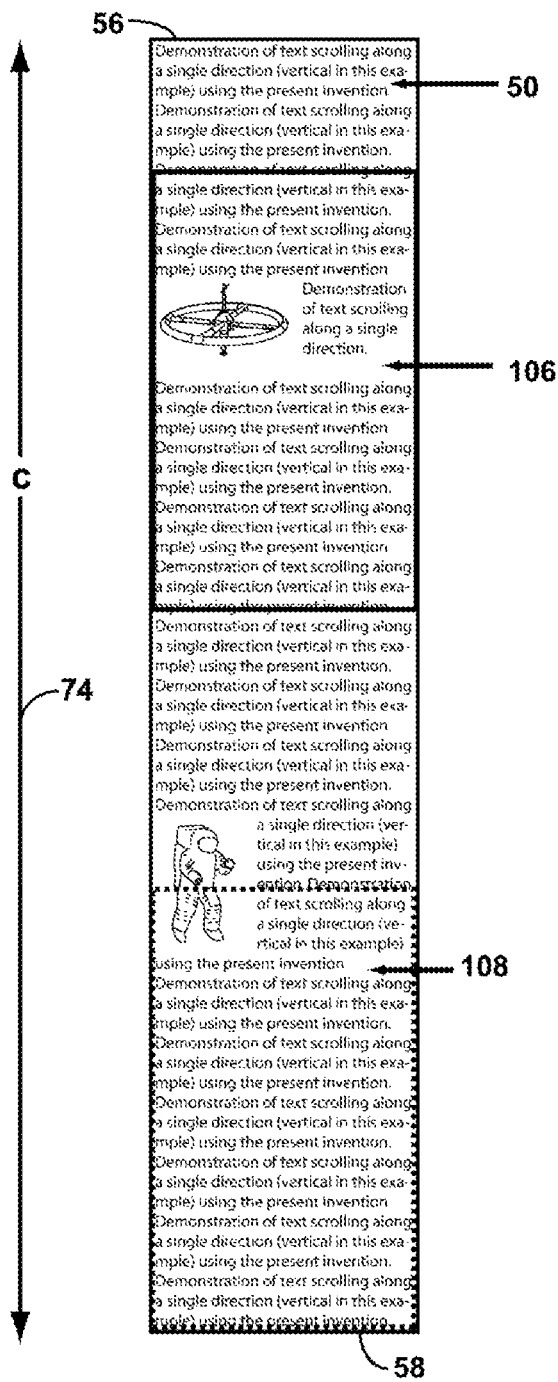
FIG. 9A shows the initial and final screen view positions in a constrained vertical scrolling example used to compare the Dynamic and the Proportional Scroll modes.

The RotoView patents cited above teach tilt-based scrolling in Dynamic Scroll mode that changes the rate of scrolling based on the changes of the tilt. FIG. 9A illustrates the constrained vertical scrolling of a web site article with a contents view 50 of height (c) 74 that is significantly larger than the height of the screen view. The screen view position at the start of the scrolling is marked by the bold line rectangle 106, and the screen view position at the end of the article is marked with the dash-line rectangle 108. Since the width of the contents view is equal to the width of the screen view (a common requirement for all mobile friendly web sites), this example illustrates a constrained vertical scrolling. The present invention uses the tilt changes in the horizontal non-scrolling direction to augment the scrolling control in a similar fashion as shown in FIG. 8, with the appropriate swap between vertical and horizontal directions. Step 228 is implemented differently when using Dynamic Scroll mode, as described below. We first compare Proportional Scroll and Dynamic Scroll for the constrained vertical scrolling example of FIG. 9A.

Figure 9B:
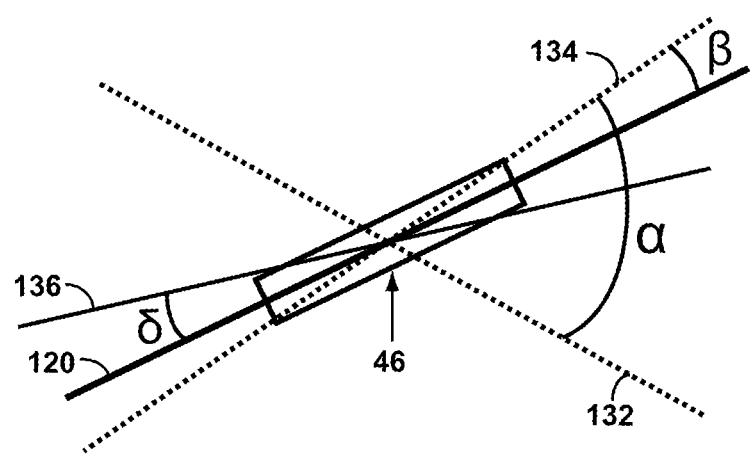
FIG. 9B illustrates several vertical tilt lines captured when the constrained vertical scrolling example of FIG. 9A is performed in the Dynamic and the Proportional Scroll modes.

FIG. 9B illustrates comparable pitch rotations when the vertical scrolling is performed in alternate scrolling runs of Dynamic and Proportional Scroll modes as seen from the left edge view 46 of the electronic device 40. Relative vertical tilt changes are translated to vertical scrolling rates (speed) using a response curve like the one shown in FIG. 9C. The operation of a constrained vertical scrolling in Proportional Scroll mode is similar to FIG. 6C or FIG. 6D with the replacement of the relevant horizontal references with vertical references. For comparison reason, we let the device start from the same arbitrary pitch baseline 120 along the pitch axis for both of the Dynamic and Proportional Scroll runs.

Figure 9C:
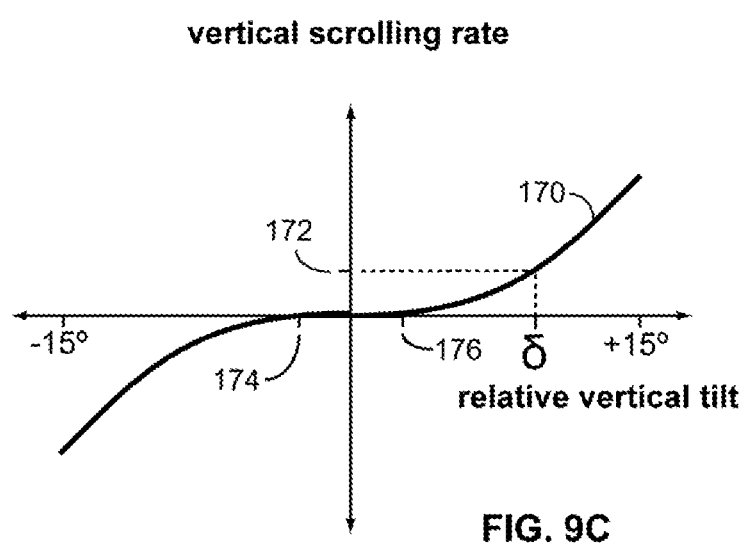
FIG. 9C demonstrates a Dynamic Scroll mode's response curve relating the relative vertical tilt to the vertical scrolling rate for the constrained vertical scrolling example of FIG. 9A.

With Dynamic Scroll mode, line 136 captures an instance of the relative pitch tilt δ which is translated to a vertical scrolling rate 172 by the response curve 170 shown in FIG. 9C. To return the scrolling rate to zero once screen position 108 is reached, the relative vertical tilt must be returned to the baseline 120.

FIG. 9B also shows the vertical rotation range α used in the Proportional Scroll run of the example of FIG. 9A. Line 132 represents the final relative pitch tilt when screen position 108 is reached at the end of the scrolling range 58. Line 134 represents the relative pitch tilt that might be captured in the scrolling run if the user temporarily moves the screen view to the top 56 of the web page in the contents view 50. The Dynamic Scroll mode of operation typically requires smaller relative tilts than the Proportional Scroll mode.

A response curve like the one shown in FIG. 9C can be a linear or a non-linear graph that relates the device relative tilt value to a scrolling rate of the screen view. Equivalently, a response graph may be represented by a table of speed values corresponding to relative tilts, a list of threshold values, or by a mathematical function that may include specific boundary conditions. A simple response curve may consist of a single value or a constant that is used to multiply the relative tilt to obtain the scrolling rate. This results in a simple linear graph that relates the relative tilt to the scrolling rate. Some applications may require a response curve with a fixed rate of scrolling, so the response curve is just a single number equal to that rate of scrolling. Other embodiments may require a response curve where only a fixed rate scrolling is needed when the relative tilt exceeds a positive threshold value (or goes below a negative threshold value). Such a response curve may be represented by a step function with one positive and one negative threshold values.

The respond curve may be selected automatically from a plurality of stored response curves to fulfill the special needs of a particular application, or it can be selected by the user who wishes to customize the scrolling speed. Some embodiments may dynamically change the response curve during the scrolling process. This allows the user to start the scrolling with a coarse response curve, followed automatically by a fine response curve. In some embodiments the user can change the response curve on the fly during the scrolling to achieve instant faster or slower response.

In the example response curve of FIG. 9C, the response curve 170 is a non-linear graph, having a range of tilts from negative value 174 to positive value 176 with a zero scrolling speed to create a threshold for noise reduction. The scrolling speed increases at an accelerated rate as the tilt increases, allowing the user to quickly scroll when producing a strong tilt and to slow down for a fine scrolling at lower tilts.

When the magnification of the screen is relatively small, the Proportional Scroll mode provides a convenient view navigation experience. Accurate rotation sensors like gyroscopes or camera sensors allow the device to use a small rotation range (e.g. 30°) to scroll the entire contents view. However, when the magnification becomes large, Proportional Scroll requires the user to rotate the device across a wide angle range in order to cover the entire contents view. This requires the user to look at the screen at a sharply oblique direction (depending where the user scrolls), which reduces the quality of image perception and the readability of the information on the display. While the rotation range can be lowered in order to allow more scrolling distance for less rotation change, scrolling accuracy is reduced and may become unstable as small rotation measurement noise may cause instability in the screen view position.

Figure 9D:
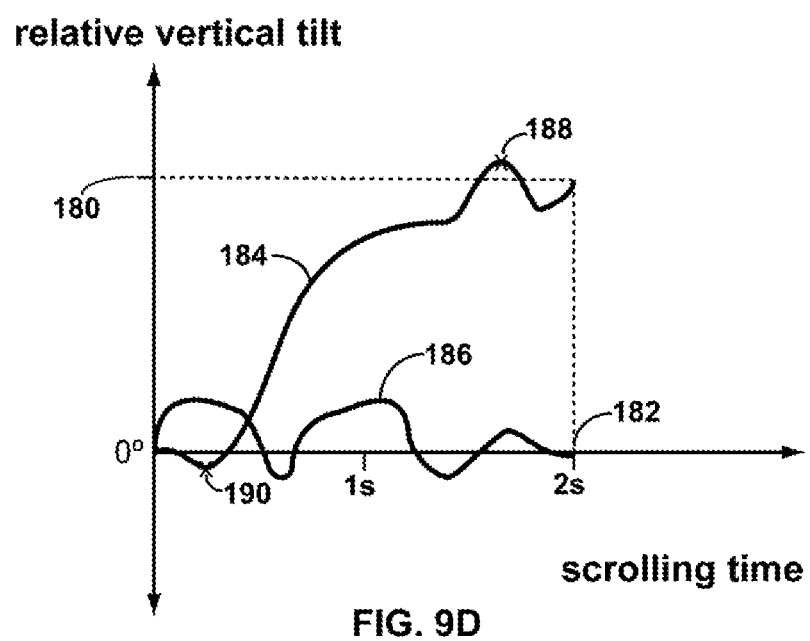
FIG. 9D illustrates the relative vertical tilt of the electronic device during the vertical scrolling example of FIG. 9A contrasting the difference between the Dynamic and the Proportional Scroll modes.

FIG. 9D contains two representative graphs showing the relative vertical tilt versus the scrolling time for both scrolling modes when performing the path from screen view position 106 to screen view position 108 of FIG. 9A. The timing graph 184 is for the Proportional Scroll mode and the timing graph 186 is for the Dynamic Scroll mode. There are many alternate timing graphs that can be captured in this example, depending how the user actually steers the device. During Proportional Scroll mode, the user must increase the relative vertical tilt (namely, rotate the device clockwise along pitch axis 62) in order to move the screen view from screen view position 106 to screen view position 108. The curvy nature of graph 184 is merely indicating how the user may have changed the relative vertical tilt along the path. At the end of the path at screen position 108, the relative vertical tilt equals the top end of the vertical rotation range α at relative vertical tilt 180. The user may tilt vertically beyond the range, as shown in graph point 188, but the screen view cannot go beyond the bottom edge of the contents view 50. The user may also temporarily introduce a negative relative tilt, as shown in graph point 190, that will move the screen view to the top 56 of the page. During the Dynamic Scroll mode, the user produces relatively small tilt changes that control the speed of scrolling. As a result, graph 186 remains bounded by a small relative vertical tilt, with a final relative tilt equal to 0° at the end of the path. The user can reach negative relative vertical tilt during Dynamic Scroll that temporarily changes the direction of the scrolling up, or reduces the scrolling speed when scrolling animation is used. Notice that if the response curve is not changing during the scroll, the graph 186 area above the 0° relative tilt is larger than the graph area below the 0° line, to achieve the scrolling distance from initial screen position 106 to final screen position 108.

Figure 10:
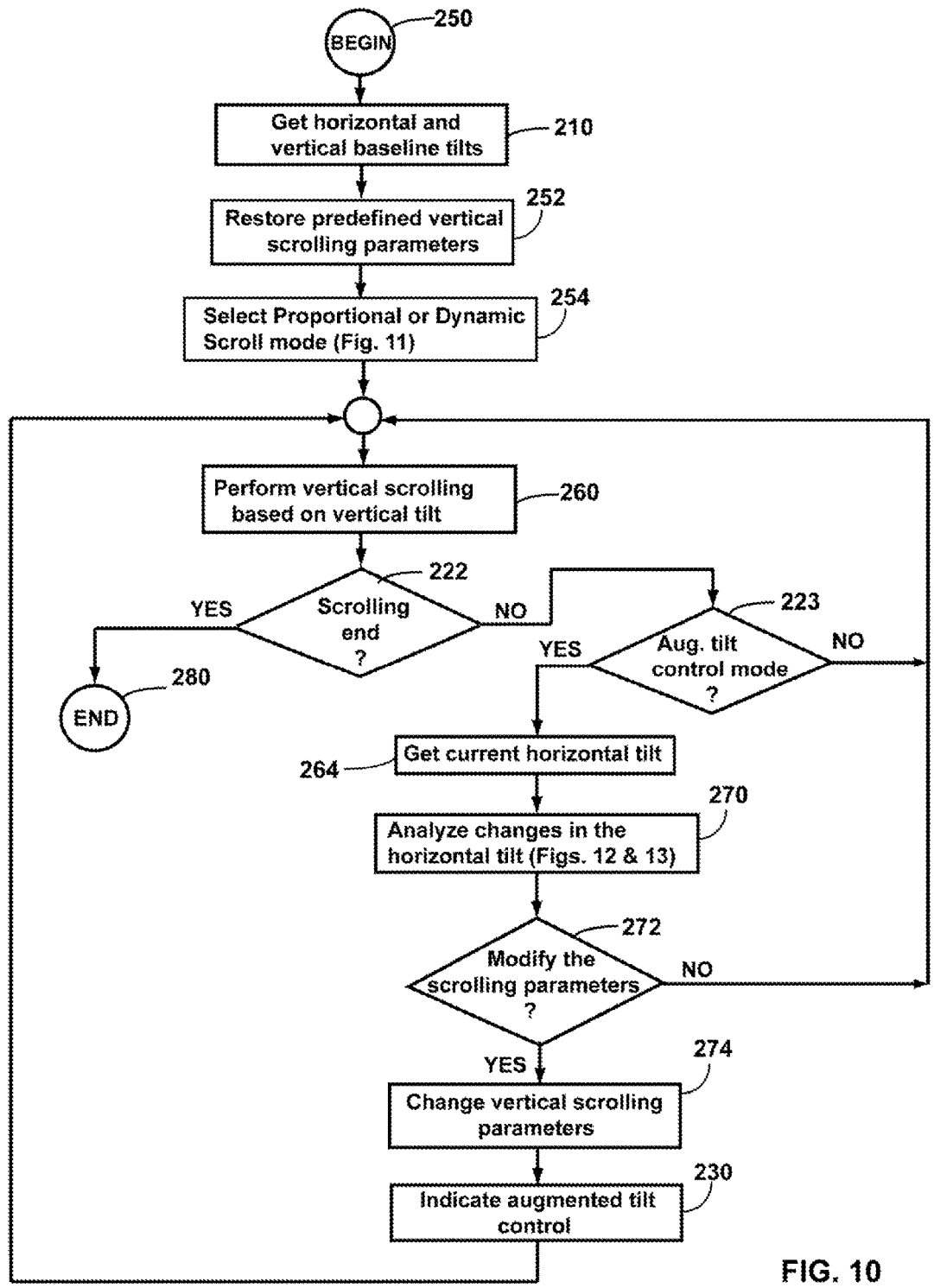
FIG. 10 shows the process flow diagram for the augmented tilt control of a constrained vertical scrolling that can use both the Proportional and the Dynamic Scroll modes.

FIG. 10 shows the process flow diagram for the augmented tilt control of the vertical scrolling example of FIG. 9A that uses both Proportional and Dynamic Scroll modes. The primary tilt in this case is the vertical direction, while the secondary tilt direction for the augmented tilt control is the horizontal direction. FIG. 10 and its derivatives (FIGS. 11-14) may also describe constrained horizontal scrolling (e.g. for FIG. 1) with augmented tilt control, provided that all references to horizontal and vertical directions are swapped. Therefore, for a constrained horizontal scrolling, the primary tilt direction is horizontal, while the secondary tilt direction is vertical. When the scrolling starts at step 250, the horizontal and vertical baseline tilts are recorded in step 210. If the device is equipped with camera sensors 22 as shown in FIGS. 4A and 4B, the horizontal tilt of the line of sight 80 may be recorded as the vertical baseline tilt. Step 252 restores the predefined vertical scrolling parameters. When the vertical scrolling uses the Proportional Scroll mode, the predefined vertical scrolling parameters consists of the vertical rotation range θ (similar to the horizontal rotation range φ recorded in step 212 of FIG. 8). The value of θ may be changed by the user or can be selected automatically for each application from preset values stored in the device settings. When the vertical scrolling uses the Dynamic Scroll mode, the predefined vertical scrolling parameters may include a scale factor k that is used to multiply the vertical scrolling rate as determined from the Dynamic Scroll response curve (e.g. FIG. 9C). Thus, the actual current vertical scrolling speed is equal to scale factor k*vertical scrolling rate. Another parameter that can be augmented is the selection of the response curve from a plurality of stored response curves. Such selection may use a discrete value response curve like FIG. 7C where each discrete value on the graph's Y axis selects a different response curve.

Proportional Scroll mode or Dynamic Scroll mode are selected initially in step 254, based on the magnification MagY=c/d for the constrained vertical scrolling, or MagX=a/b for the constrained horizontal scrolling, as taught in the parent application Ser. No. 14/340,476. More details of the scroll mode selection appear below with the discussion of FIG. 11. In some embodiments, the selection of the scroll mode is repeated when the size of the contents view changes.

The vertical scrolling is performed in step 260 based on changes in the vertical tilt, initially utilizing the current scrolling parameters that were set in step 252. Decision step 222 checks if the View Navigation mode is completed (i.e. the user indicates that the scrolling should end and the system returns to the Fixed mode at step 280). If the View Navigation mode is still on, decision step 223 tests if the Augmented Tilt Control mode is active. If the mode is not active, constrained vertical scrolling step 260 continues. If the mode is active, then step 264 measures the current horizontal tilt either from the motion sensor 20 or from the camera sensors 22, and computes the relative horizontal tilt by comparing the current horizontal tilt to the horizontal baseline tilt recorded in step 210.

Step 270 analyzes changes in the relative horizontal tilt in accordance with the selected Proportional or Dynamic Scroll mode as described below in the process flow chart of FIGS. 12 and 13. A modify flag is set when step 270 determines that the scrolling parameters need to be augmented based on the changes in the horizontal tilt. This modify flag is examined in decision step 272. If no modification is required, the loop comprising steps 260, 222, 264, 270 and 272 repeats. If a modification is required, step 274 changes the vertical scrolling parameters. Step 230 optionally provides indication to the user that the scrolling parameters have been changed.

Figure 11:
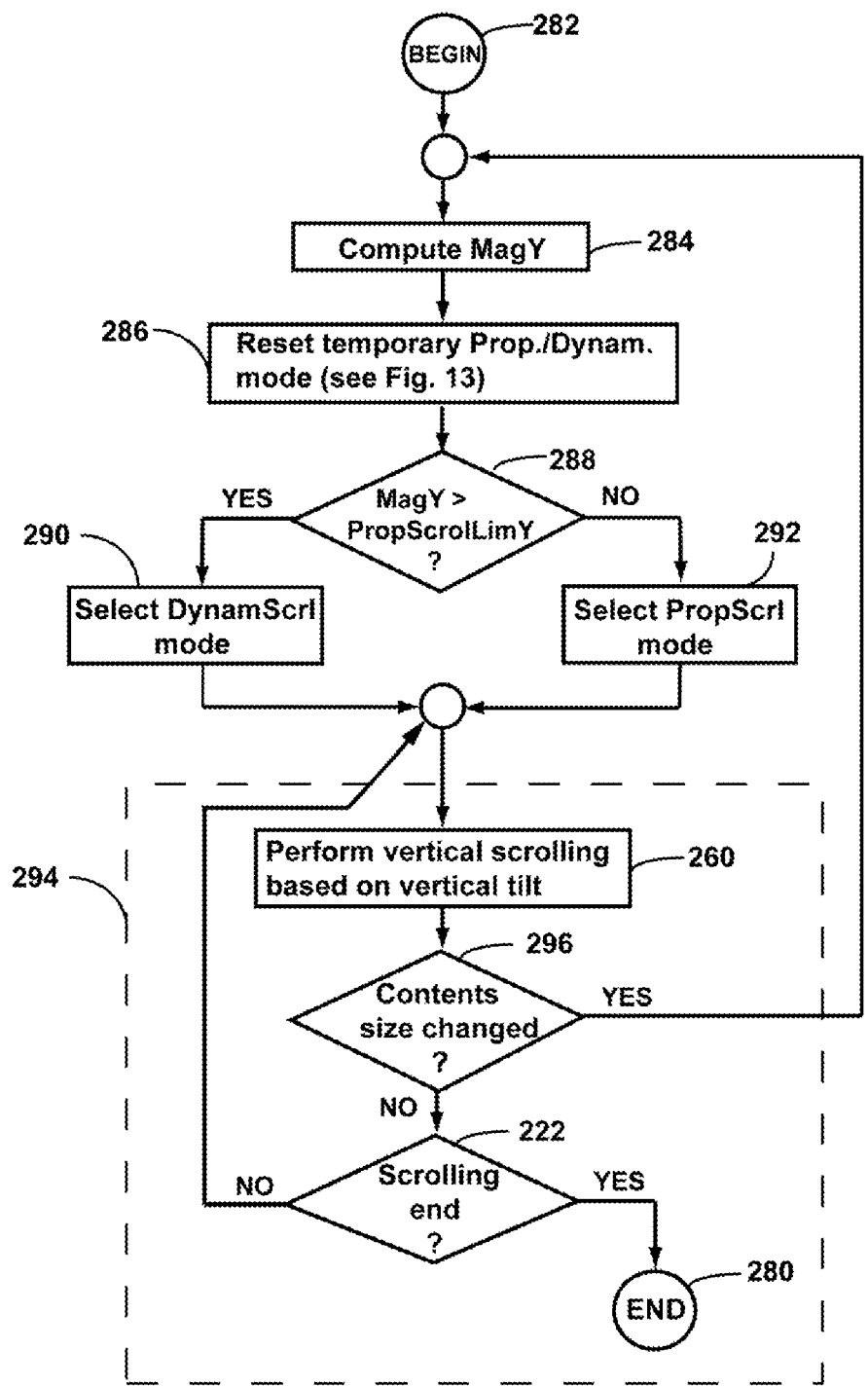
FIG. 11 shows the process flow diagram for the automatic selection of the Proportional and the Dynamic Scroll modes based on the contents view magnification.

FIG. 11 shows the software flow diagram of a motion-based view scrolling system that automatically selects the vertical scrolling mode based on the vertical magnifications of the contents view in step 254 of FIG. 10. The program computes the vertical magnification MagY at step 284. For some embodiments that allow temporary override of the scroll mode (as discussed in FIG. 13 below), optional step 286 resets the corresponding Temporary Proportional/Dynamic mode. At decision step 288 the program checks if the vertical magnification MagY is larger than a limit value PropScrolLimY, and if so it selects the Dynamic Scroll mode at step 290. If MagY is smaller than or equal to PropScrolLimY, step 292 selects the Proportional Scroll mode for the constrained vertical scrolling. As noted throughout the disclosure, FIG. 11 can be modified for constrained horizontal scrolling by comparing the horizontal magnification MagX to the corresponding horizontal limit value PropScrolLimX. Both magnification limit values can be selected automatically for each type of media to be scrolled, and the may be modified by the user to fine tune the automatic mode selection according to her preferences.

The scrolling process 294 is iteratively repeated along the loop of step 260 and decision steps 222 as described in the discussion above of FIG. 10. In some applications (e.g. maps) the contents view size changes dynamically as it is being downloaded to the device via the internet/cloud network 32 of FIG. 3. Decision step 296 monitors the contents view size and determines if the size changed. If the size changed, it repeats the scroll mode selection process of steps 284 and 288 to insure that the scroll mode selection applies to the new MagY. In some embodiments, the determination of contents size change 296 and scrolling end 222 can rely on interrupt notification rather than on the polling mechanism illustrated in FIGS. 10 and 11.

Figure 12:
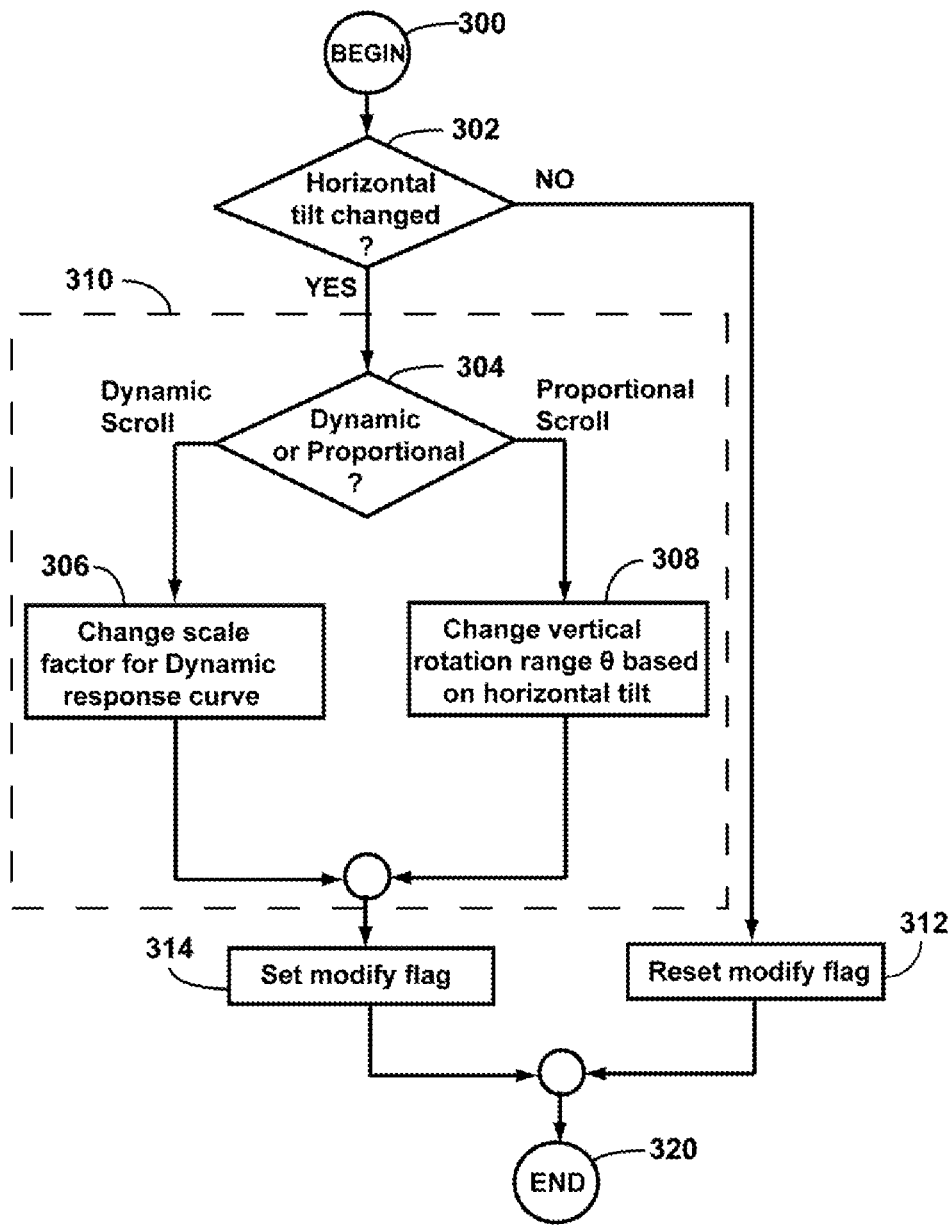
FIG. 12 shows the inner process flow diagram for step 270 of FIG. 10 in some embodiments.

FIG. 12 shows the process flow diagram for step 270 of FIG. 10 that analyzes the changes in the horizontal relative tilt. Decision step 302 tests whether the horizontal relative tilt has changed. If the horizontal tilt has not changed (or changed below a predefined threshold value), step 312 resets the modify flag so that decision step 272 will not modify the scrolling parameters. If the horizontal tilt has changed, decision step 304 checks whether the current scrolling mode is Proportional Scroll mode or Dynamic Scroll mode. If the constrained vertical scrolling is using the Proportional Scroll mode, step 308 changes the vertical rotation range θ based on the horizontal relative tilt changes, in a similar fashion to the constrained horizontal scrolling of FIG. 8. If the constrained vertical scrolling is using the Dynamic Scroll mode, step 306 is used to augment the Dynamic Scroll mode parameters. In some embodiments, the changes in the horizontal relative tilt modify the value of the scale factor k following response curves similar to FIGS. 7A-7D (with curves relating the relative horizontal tilt to scale factor k). When k=1, the Dynamic Scroll response curve (e.g. FIG. 9C) determines the vertical scrolling rate directly from the relative horizontal tilt reading. For a broad rate control, one can use k values between 1/3 to 3.0 or other similar limits. Both steps 306 and 308 set the modify flag 314 to implement the new vertical scrolling parameters in step 274 of the process flow diagram of FIG. 10. Section 310 of FIG. 12 combines decision step 304 and steps 306 and 308 to be reused below.

It will be appreciated that the process flow diagram of FIGS. 10, 11 and 12 are illustrative and that variations and modifications are possible. Operations described as sequential may be executed in parallel, order of operation may be varied, and operations may be modified, combined, added or omitted. For instance, step 270 of FIG. 10 can be implemented to provide more elaborated tilt control that may temporarily switch the main scrolling mode from Proportional to Dynamic or vice versa. Since the Proportional and Dynamic Scroll modes were initially selected in step 254 to accommodate the magnification, constrained vertical scrolling of large web pages will typically be run in Dynamic Scroll mode. While this is convenient during the scrolling, the user may want to temporarily switch to Proportional Scroll mode so that she can quickly scroll the entire page by traversing the vertical rotation range θ. In other circumstances, there might be a need to temporarily switch from Proportional Scroll mode to Dynamic Scroll mode to allow better viewing angle (Dynamic Scroll mode always resets the relative tilt in the constrained scrolling direction to 0°).

Figure 13:
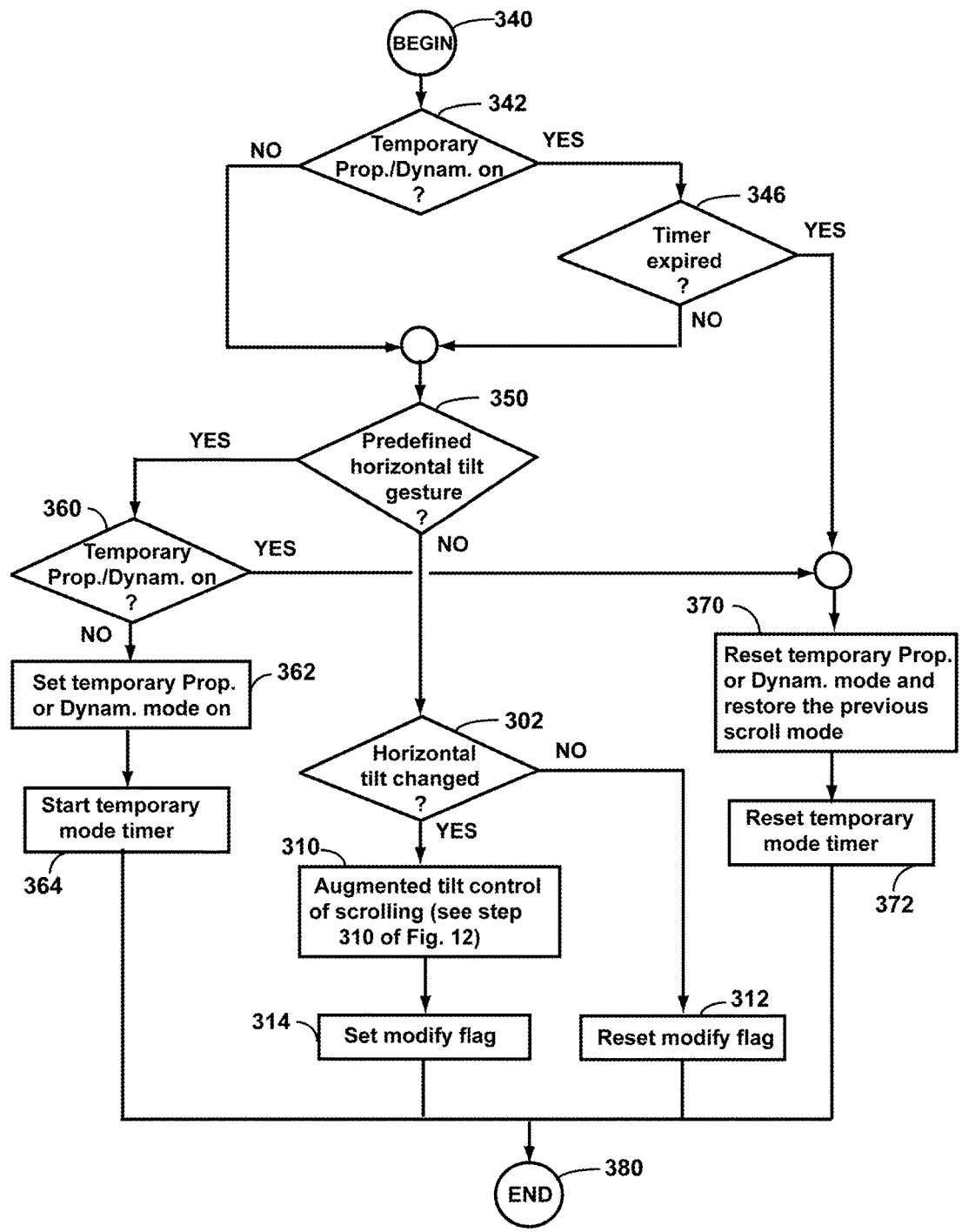
FIG. 13 shows a more elaborate inner process flow diagram for step 270 of FIG. 10 in some embodiments.

Such an arrangement is depicted in the process flow diagram of FIG. 13 that implements step 270 of FIG. 10. There is a Temporary Proportional/Dynamic mode flag which is reset when step 254 of FIG. 10 selects the preferred scrolling mode. Decision step 342 checks if a Temporary Proportional/Dynamic mode has been set to override the preferred scrolling mode selection. If the Temporary Proportional/Dynamic mode is on (indicating a scroll mode override), decision step 346 checks whether an optional Temporary Mode Timer, that is used to limit the time duration of the temporary mode, has expired. If it has expired, steps 370 and 372 reset the Temporary Proportional/Dynamic mode and the Temporary Mode Timer. Step 370 also restores the previously selected preferred scrolling mode (that was determined in step 254 of FIG. 10). If decision step 342 shows that the Temporary Proportional/Dynamic mode is off or if decision step 346 indicates a non-expired Temporary Mode Timer, the program proceeds to decision step 350 that analyzes a trail of the horizontal relative tilt to determine if a predefined horizontal tilt gesture was made. Such a tilt gesture may exhibit a sharp positive spike above a first predefined trigger value (e.g. 198 in FIG. 14) or a sharp negative spike below a second predefined trigger value (e.g. 196 in FIG. 14). If step 350 does not detect such a gesture, the program continues with decision step 302 and section 310 (similarly to FIG. 12) to process the augmented tilt control of the vertical scrolling. Steps 312 and 314 set or reset the modify flag appropriately.

The predefined horizontal rotation gesture may be used to toggle the Temporary Proportional/Dynamic mode. If step 350 detected a predefined horizontal tilt gesture, decision step 360 checks if the Temporary Proportional/Dynamic mode is on. If it is on, steps 370 and 372 reset the Temporary Proportional/Dynamic mode and the optional Temporary Mode Timer to return the scrolling mode to the preferred mode (of step 254 of FIG. 10). If it is not on, step 362 sets the Temporary Proportional/Dynamic mode on and optional step 364 starts the Temporary Mode Timer. Step 314 sets the modify flag to allow step 274 to update step 260 in FIG. 10 as to the temporarily modified Scroll mode.

Figure 14:
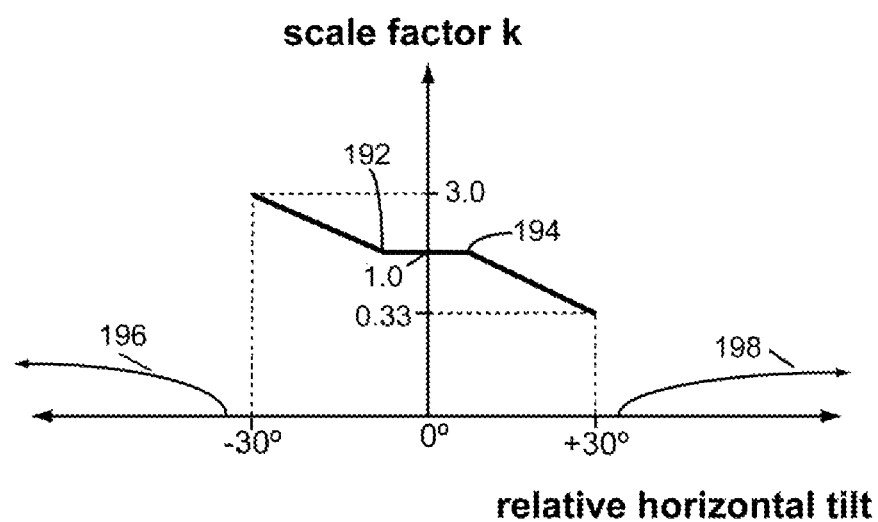
FIG. 14 demonstrates a response curve relating the relative horizontal tilt to the scale factor k for the computation of the vertical scrolling rate for the constrained vertical scrolling example of FIG. 9A.

FIG. 14 illustrates the response curve for the augmented tilt control step 310 of the process flow diagram of FIG. 13 in some embodiments. The response curve is also designed to accommodate the detection of a sharp horizontal tilt gesture (or a spike gesture) that toggles the Temporary Proportional/Dynamic mode. Changes in the relative horizontal tilt are being translated to the scale factor k that increases or reduces the scrolling rate. Once the relative horizontal tilt exceeds a preset value (e.g. 30°) 198 or goes below a minimum value (e.g. −30°) 196, the relative horizontal tilt is inspected to detect the occurrence of the predefined horizontal tilt gesture for decision step 350 of FIG. 13. There are many methods to define the sharp tilt gesture. A simplified detection may be triggered every time that the horizontal tilt just goes beyond the boundary between 192 and 194. Other detection schemes may employ time trail analysis of the horizontal tilt trajectory to determine a sharp left or right rotations within a preset time period. Such tilt detection may be made even within the response area of the curve of FIG. 14 (e.g. −30° to +30°). Yet another tilt gesture detection may limit the tilt transition only to one side of the response curve (e.g. the negative range 196).

In some embodiments, the spike gestures 196 or 198 may be used to activate or deactivate the Augmented Tilt Control mode itself. For example, a counter clockwise spike 196 (followed by a return of the relative horizontal tilt towards 0°) may be used to activate the Augmented Tilt Control mode. Once the user completes the selection of the scale factor k, a clockwise spike 198 (followed by a return of the relative horizontal tilt return towards 0°) may be used to de-activate the Augmented Tilt Control mode. A time trail analysis of the horizontal tilt trajectory may be used to determine what is the last stable value of the scale factor k just before the spike gesture was initiated. This stable value becomes the final value of the scale factor k during the remainder of the scrolling operation.

Figure 15A:
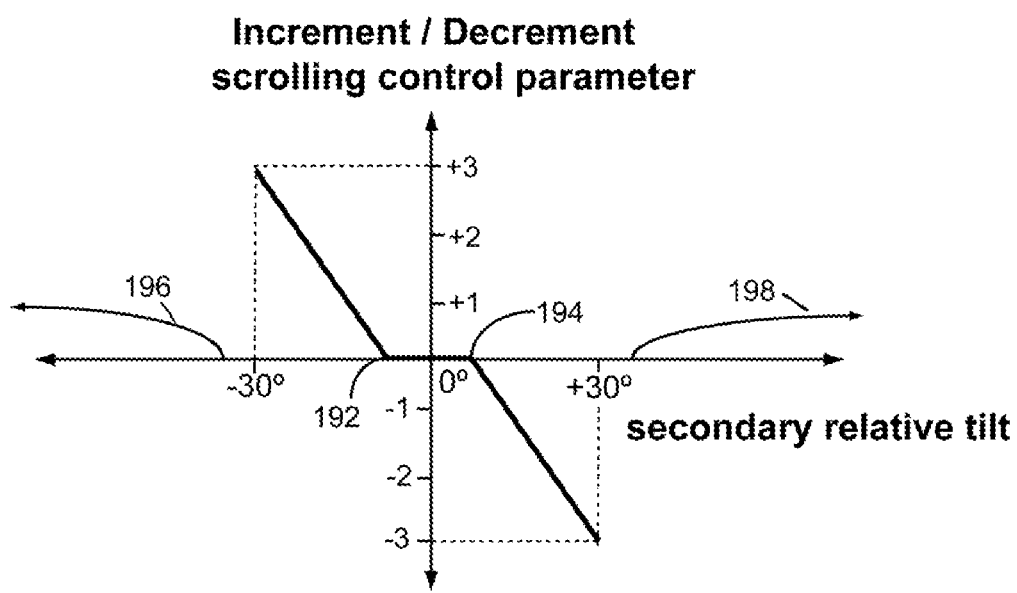
FIG. 15A illustrates a response curve for changing the scrolling control parameter iteratively.
Figure 15B:
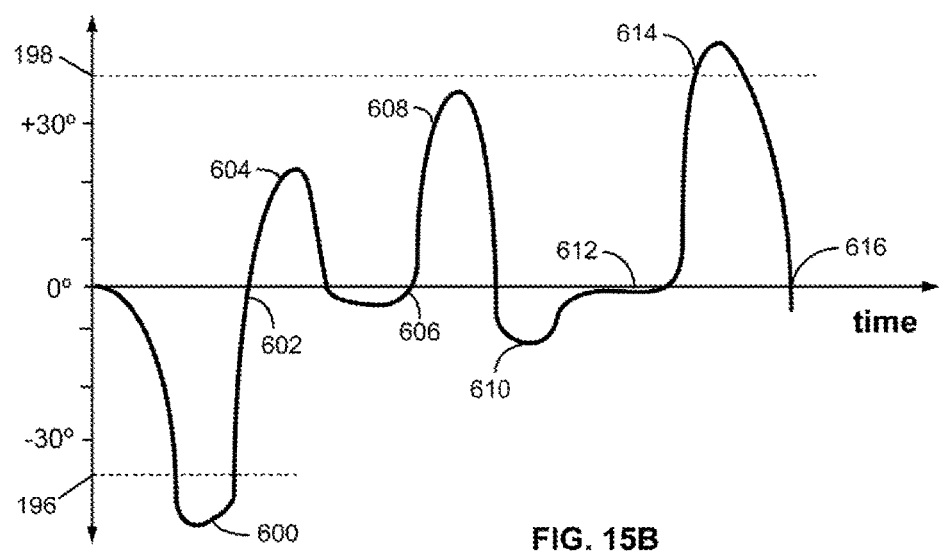
FIG. 15B demonstrates a modification of a scrolling control parameter using the response curve of FIG. 15A.

Predefined spike gestures may be employed in a similar manner in FIGS. 7B, 7C and 7D to activate and deactivate the Augmented Tilt Control mode. Notice that in the response graphs of FIGS. 7B, 7C, 7D, and 14, the secondary relative tilt is mapped directly to the desired value of the scrolling control parameter. In some embodiments it is possible to perform the augmented tilt control using a series of increments or decrements until the desired value is achieved. FIGS. 15A and 15B further demonstrate this approach.

FIG. 15A illustrates the relations between the secondary relative tilt and the increment or decrement values of the scrolling control parameter. Similar to the discussion of FIG. 14, the secondary relative tilt values 196 and 198 (beyond a predefined range) may be used as spike thresholds for predefined spike gestures to activate and deactivate the Augmented Tilt Control mode. FIG. 15A shows by way of illustration that the scrolling control parameter (e.g. rotation range for Proportional Scroll mode or scale factor k for Dynamic Scroll) can be incremented by 1, 2, or 3 arbitrary units in each secondary relative tilt direction.

FIG. 15B shows the secondary relative tilt behavior over time to illustrate an example where the scrolling control parameter is modified by +4 units. The Augmented Tilt Control mode is activated at the start of the process with a counter clockwise spike 600 in the secondary relative tilt that goes below the predefined lower gesture threshold 196 and then returns to 0° at 602. Changing the secondary relative tilt clockwise from point 602 to point 604 adds 2 units to the scrolling control parameter as the secondary relative tilt crosses 20° (according to the response curve of FIG. 15A). Returning the secondary relative tilt towards 0° does not cross the −10° at point 606 so that the total increase of the scrolling control parameters remains at +2 units. The user keeps scrolling (using changes in the primary tilt) to check if the change of +2 units is enough. At point 608, the user adds 3 more units as the clockwise rotation exceeds 30°. A counter clockwise rotation to point 610 exceeds −10°, so the total of 5 is now decreased by −1 unit. The user keeps scrolling (using changes in the primary tilt) during the period of time around 612 to verify that the last change is effective. Assuming that current change in the scrolling control parameter is fine, the user terminates the Augmented Tilt Control mode. To do that, the device is rotated clockwise to point 614 that the secondary relative tilt crosses the predefined upper gesture threshold 198. While +3 units were added temporarily to the total change during the rotation from points 612 to 614, the detection of the gesture at 616 restores the total change of the scrolling control parameter to the desired 4 units. The detected gesture deactivates the Augmented Tilt Control mode and changes the current scrolling control parameter by adding 4 units.

Figure 16:
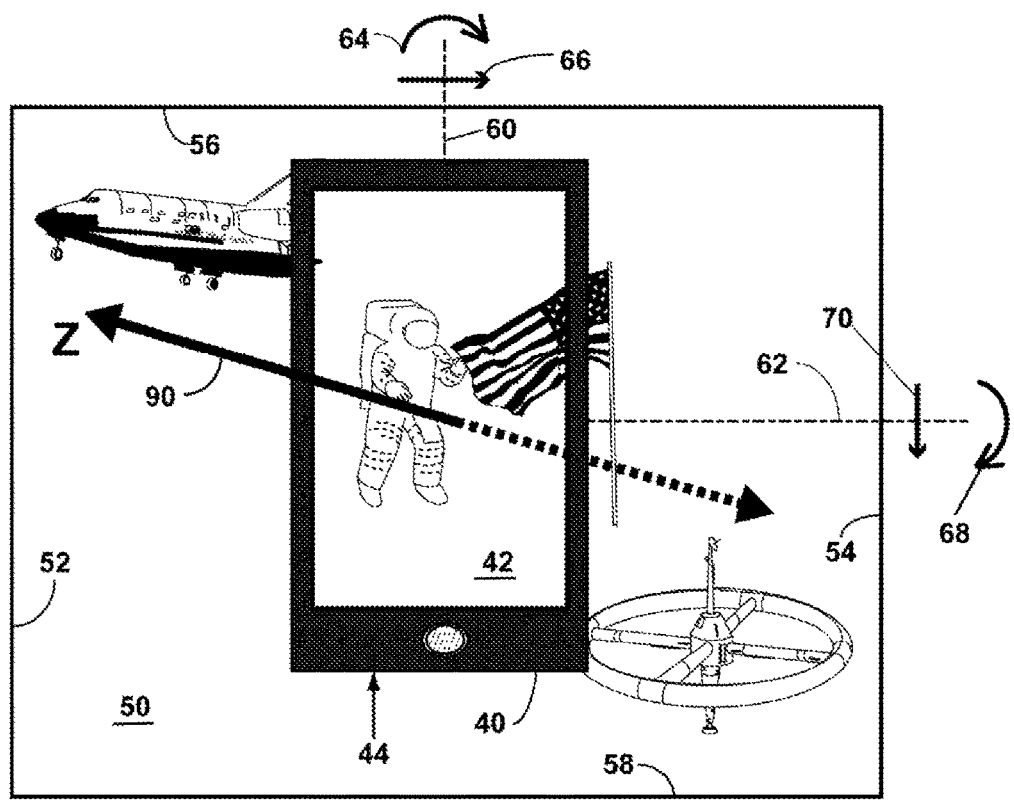
FIG. 16 describes a multi-directional scrolling when the contents view exceeds the size of the screen view in both the horizontal and the vertical directions.

FIG. 16 describes the case of general scrolling where the contents view 50 exceeds the size of the screen view 42 in both the horizontal and the vertical directions. We refer in this disclosure to this type of scrolling as multi-directional scrolling. FIG. 16 shows the same pitch 62 and roll 60 rotation axes that were shown in FIGS. 1, 2A and 2B, and also introduce an additional axis 90 that is perpendicular to the surface of the screen view. Axis 90 would coincide with the Z axis of a standard Cartesian coordinates system where the X axis aligns with the pitch axis 62 and the Y axis aligns with the roll axis 60. Therefore, axis 90 is referred to as the Z-axis. FIG. 4A shows that the line of sight 80 to the screen view 42 coincides with the Z-axis during the optimal viewing condition.

As we have shown above for the constrained horizontal and vertical scrolling, it is highly desired to allow the user to modify the multi-directional scrolling control parameters dynamically during the scrolling process. For example, a useful scrolling control parameter is the scrolling intensity. The scrolling intensity parameter relates to the speed response for tilt changes for dynamic scroll mode. For proportional scroll mode, the scrolling intensity parameters relate to the horizontal and vertical tilt rotation ranges. While a common tilt rotation range can be used for both the horizontal and the vertical directions, the user may explicitly select which one will be changed in a particular control session.

Figure 17A:
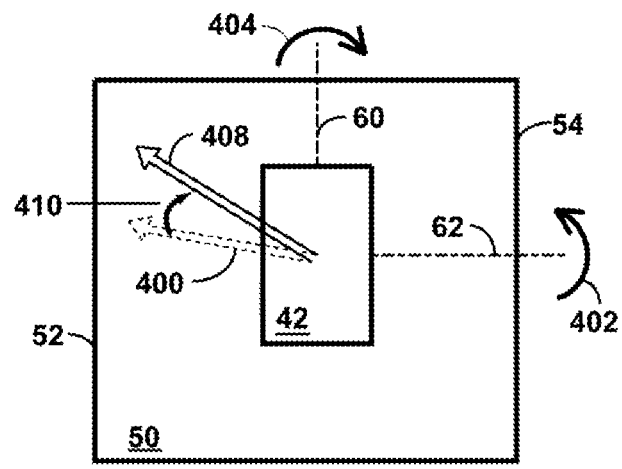
FIG. 17A shows the normal operation of the multi-directional scrolling.
Figure 17B:
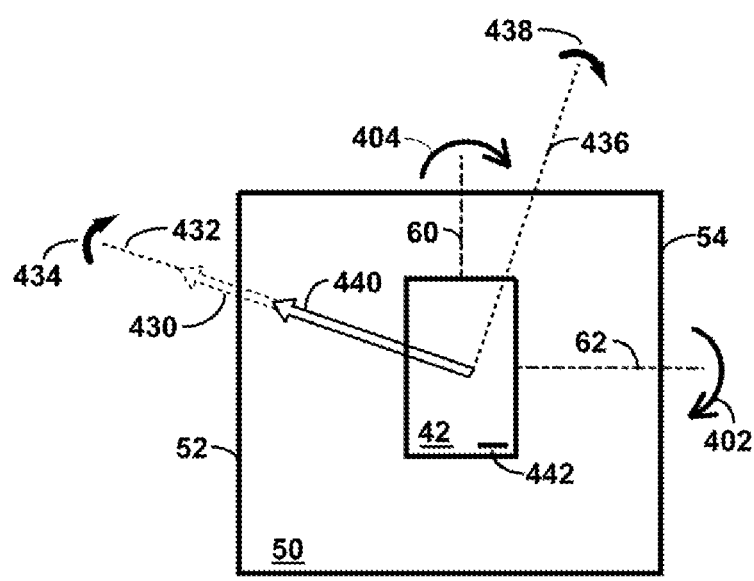
FIG. 17B discloses an augmented tilt control for multi-directional scrolling application.

In some embodiments, a method to change scrolling parameters dynamically for multi-directional scrolling application is disclosed in FIGS. 17A and 17B. The multi-directional tilt-based scrolling operation generally operates in two modes: the normal mode; and the Augmented Tilt Control mode. FIG. 17A illustrates the normal mode of operation, where the tilt changes along the pitch 62 and roll 60 axes change the scrolling intensity and the scrolling direction simultaneously. It shows how the initial scrolling direction and scrolling intensity, represented by the dotted arrow 400, are changed in response to the pitch tilt change 402 and the roll tilt change 404 to reach the new scrolling direction and scrolling intensity represented by the arrow 408. The combined tilt changes 402 and 404 cause the scrolling direction to change by angle 410 and increased the scrolling intensity. The scrolling control parameters are not changed during normal mode.

FIG. 17B illustrates the operation of the augmented tilt control during the Augmented Tilt Control mode. The dotted arrow 430 represents the initial scrolling direction and scrolling intensity when the Augmented Tilt Control mode is activated. In response to this activation, a locked scrolling direction axis 432 is set to the direction of arrow 430 with a corresponding orthogonal axis 436 set along the surface of the screen view 42. During the Augmented Tilt Control mode, the device pitch tilt changes 402 and the roll tilt changes 404 are readily mapped to the locked axes 432 and 436 by multiplying these readings with the appropriate trigonometric functions. As a result, the mapped tilt change 438 along axis 436 is used for controlling the unidirectional scrolling of the screen view 42 along axis 432. The mapped tilt change 434 along axis 432, which is parallel to the scrolling direction 432, is used for augmented tilt control in a similar way to the augmented tilt control for the constrained scrolling embodiments described above.

The system provides the user with an optional visual indication 442 when the Augmented Tilt Control mode is on. The user then expects the scrolling to be constrained to the initial scrolling direction, and she can perform the augmented tilt control process. The visual indication 442 may be optionally incorporated within the "RotoView" Scroll Controller of my U.S. Pat. No. 8,675,019, if the Scroll Controller is implemented in the tilt-based scrolling system.

Figure 18:
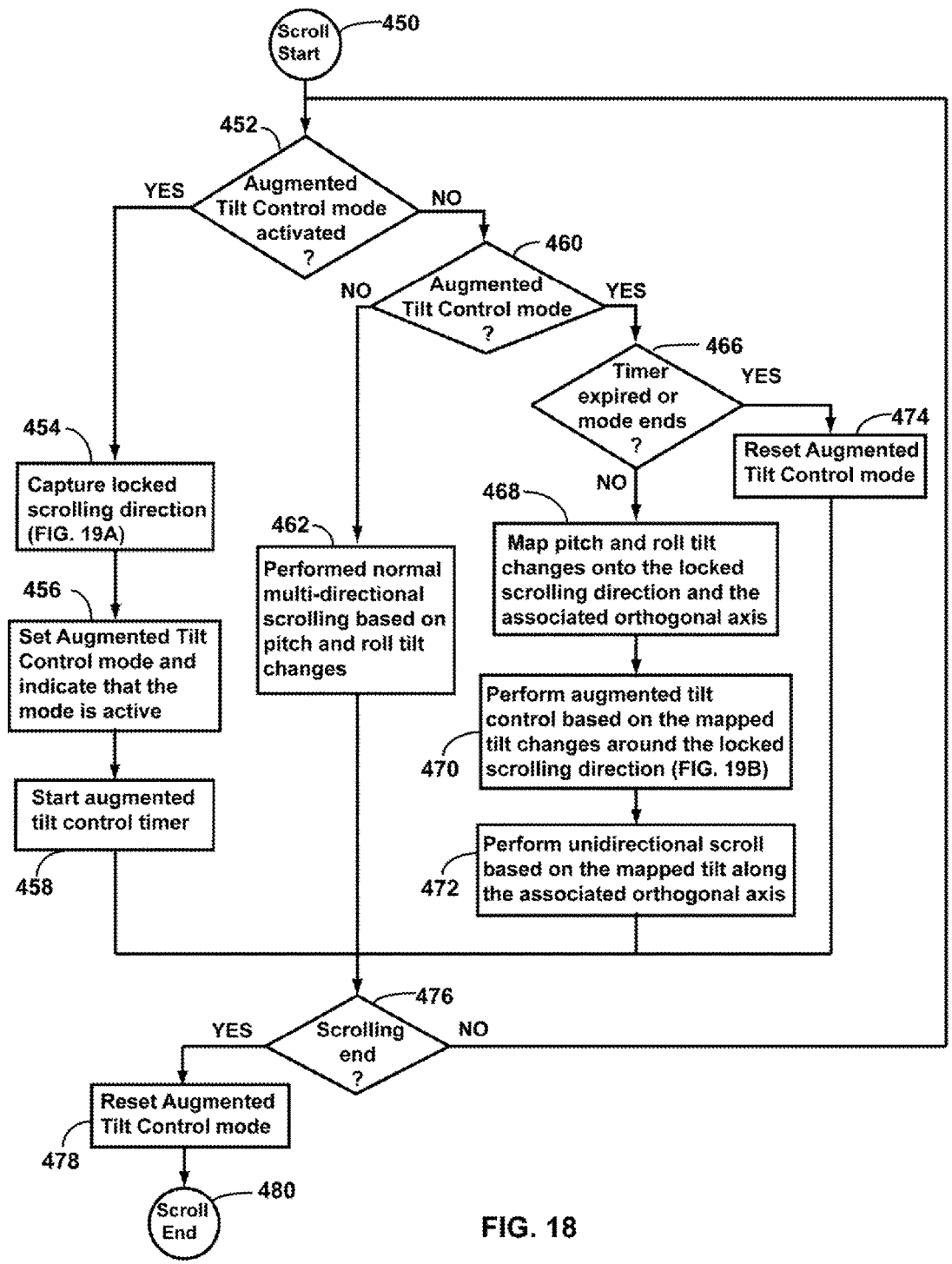
FIG. 18 shows the process flow diagram for the augmented tilt control of the multi-directional scrolling illustrated in FIGS. 17A and 17B.

FIG. 18 shows the process flow diagram for the augmented tilt control of the multi-directional scrolling shown in FIGS. 17A and 17B, that is applicable for both Proportional and Dynamic Scroll modes. The augmented tilt control can start automatically when the scrolling starts and lasts for a predefined period. Alternatively, it can be initiated or terminated explicitly by a user command, e.g. in response to a touch command at a predefined area of the screen view 42 (or on a specific switch or keyboard 23 that is embedded on the case). The user can also activate and deactivate the Augmented Tilt Control mode by following uniquely predefined hand gestures. In some embodiments with a Z-distance sensor, the user may bring the device closer to the eyes and then return it to the original position in order to generate a predefined hand gesture that can be detected by monitoring the Z-distance. This predefined hand gesture may be used to activate and/or to deactivate the Augmented Tilt Control mode. When decision step 452 detects that the augmented tilt control is activated, step 454 captures the current scrolling direction (axis 432 in FIG. 17B) and locks it for the constrained unidirectional scrolling that is allowed during the augmented tilt control. Step 454 also selects the associated orthogonal axis (436 in FIG. 17B) that controls the actual scrolling during the augmented tilt control. Step 454 is described in more detail in FIG. 19A.

Once the scrolling direction and associated orthogonal axis are captured, step 456 sets the Augmented Tilt Control mode. Step 456 may also provide a visual or audio or haptic feedback indication to the user that the Augmented Tilt Control mode is active. In some embodiments, step 458 may optionally start the augmented tilt control timer to terminate the Augmented Tilt Control mode after a predefined time period. Once the Augmented Tilt Control mode is activated by steps 454, 456 and 458, decision step 476 checks if scrolling ends (e.g. by a user scrolling termination command), and if so, step 478 resets the Augmented Tilt Control mode and ends the scrolling via the end step 480. If scrolling continues, the process continues through decision steps 452 and 460. Decision step 460 checks if the Augmented Tilt Control mode is on so that the program flows into two main program branches, the augmented tilt control program branch (performing FIG. 17B) and the normal scrolling program branch (performing FIG. 17A).

The augmented tilt control branch comprises steps 466, 468, 470, 472, 474 and 476. Decision step 466 terminates the augmented tilt control if the augmented tilt control timer activated in step 458 is expired, or if the user issued a termination command. If the mode is expired or terminated by the user, step 474 resets the Augmented Tilt Control mode and continues scrolling via decision step 476. If augmented tilt control is still active, step 468 maps the device's pitch and roll tilt changes onto the locked scrolling direction axis and the associated orthogonal axis. Step 470 then performs the augmented tilt control to modify the intensity of scrolling based on tilt changes around the locked scrolling direction axis, in a similar process described above for the constrained horizontal or vertical scrolling. FIG. 19B further describes the process of step 470 in more detail. Actual scrolling continues during augmented tilt control, but is constrained along the locked scrolling direction, as shown in FIG. 17B. Step 472 performs the unidirectional scrolling in response to tilt changes mapped around the associated orthogonal axis (436 in FIG. 17B). Thus the user can see an immediate response to the changes in the scrolling intensity (or any other scrolling parameter controlled by the augmented tilt control) made by step 470.

When decision step 460 determines that the Augmented Tilt Control mode is off, the normal scrolling branch comprising steps 460, 462, 476 and 452 perform the multi-directional scrolling, using any modified scrolling parameter (e.g. scrolling intensity). Decision step 452 responds to any user command that re-activates the Augmented Tilt Control mode by repeating the initialization of augmented tilt control via steps 454, 456 and 458. Step 462 performs the normal multi-directional scrolling based on the pitch and roll tilt changes in accordance with the active Proportional or Dynamic Scroll mode.

Figure 19A:
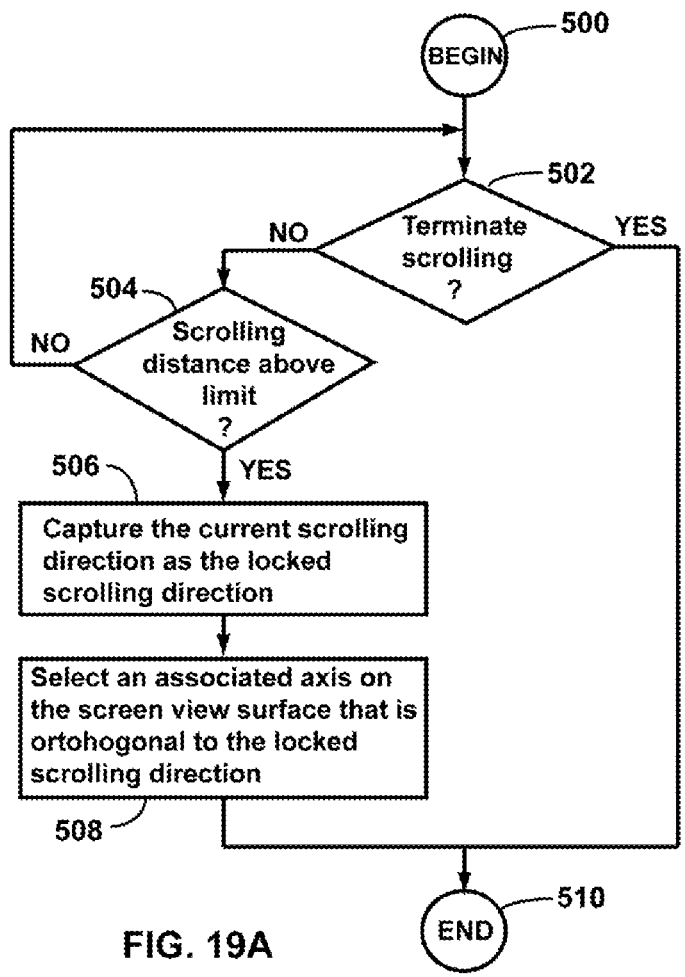
FIG. 19A illustrates the process flow diagram of capturing the scrolling direction and the associated orthogonal axis of FIG. 17B.
Figure 19B:
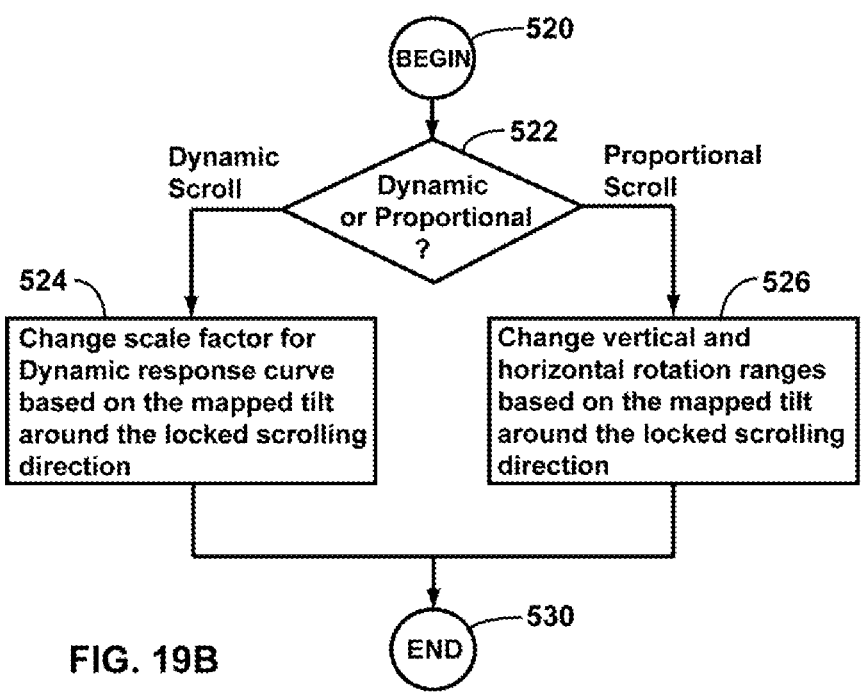
FIG. 19B illustrates the process flow diagram of changing the scrolling parameters based on the tilt around the locked scrolling direction of FIG. 17B.

FIG. 19A illustrates the process of capturing the scrolling direction and the associated orthogonal axis of step 454. Since the user may terminate the scrolling altogether at any given time, decision step 502 terminates the process accordingly. The goal is to capture the true current scrolling direction when the Augmented Tilt Control mode is initiated and to avoid selecting an erroneous direction due to a minor tilt to the wrong direction because of a user hand tremor. This is done in decision step 504 which monitors actual scrolling along a given direction and triggers the direction detection only when the scrolling distance exceeded a predefined length. The scrolling distance and the predefined length may be measured as a percentage of the length of the contents view (or the screen view), or it might be measured in pixel length or other equivalent measuring units. If the scrolling direction is erratic, decision steps 502 and 504 reiterates until a valid direction is detected or until scrolling termination. There are other possible methods to detect the current scrolling direction without looking at the actual scrolling distances, e.g. by taking a tilt magnitude change above a predefined limit.

When a scrolling direction is detected, step 506 captures the scrolling direction angle relative to the roll 60 and pitch 62 axes of the device. The scrolling direction (axis 432) is in the same surface of the screen view as the roll and pitch axes. Step 508 selects the associated orthogonal axis 436 that is also in the plane of the screen view surface. Subsequent mapping of tilt changes measured along the pitch and roll onto axes 432 and 436 is readily done by multiplying these measurements with the appropriate trigonometric functions using the relative scrolling direction angle.

FIG. 19B describes the augmented tilt control operation to change the intensity of scrolling of step 470 of FIG. 18. Since the scrolling is constrained along the locked scrolling direction 430, and the augmented tilt control is taken around axis 432, the process can utilize all the detailed techniques described above for the constrained horizontal and vertical scrolling. In particular, decision step 522 determines if the current scroll mode is Proportional or Dynamic and accordingly performs step 524 (Dynamic Scroll mode) or step 526 (Proportional Scroll mode). Thus for the Dynamic Scroll mode, a scale factor for the Dynamic response cure is changed based on the mapped tilt around the locked scrolling direction (axis 432). For the Proportional Scroll, the vertical and horizontal rotation ranges are changed based on the mapped tilt around the locked scrolling direction (axis 432). In some embodiments it is possible to change only one of the ranges. This can be done, among other ways, by setting the lock scrolling direction to the general direction (vertical or horizontal) that the user wants to affect. Alternatively, the user can explicitly select the scrolling parameter to be modified by the augmented tilt control via a touch command, an optional button or a predefined hand gesture.

In some embodiments, changing the scrolling parameters dynamically for multi-directional scrolling application is based on sensing the relative changes of the Z-distance defined in FIG. 16. As mentioned, the Z-distance is the measured distance between the screen view 42 and the user's eyes. The Z-distance changes can be sensed directly by the proximity sensor 21 or by triangulation from the camera sensors 22 that view the user's head.

Figure 20:
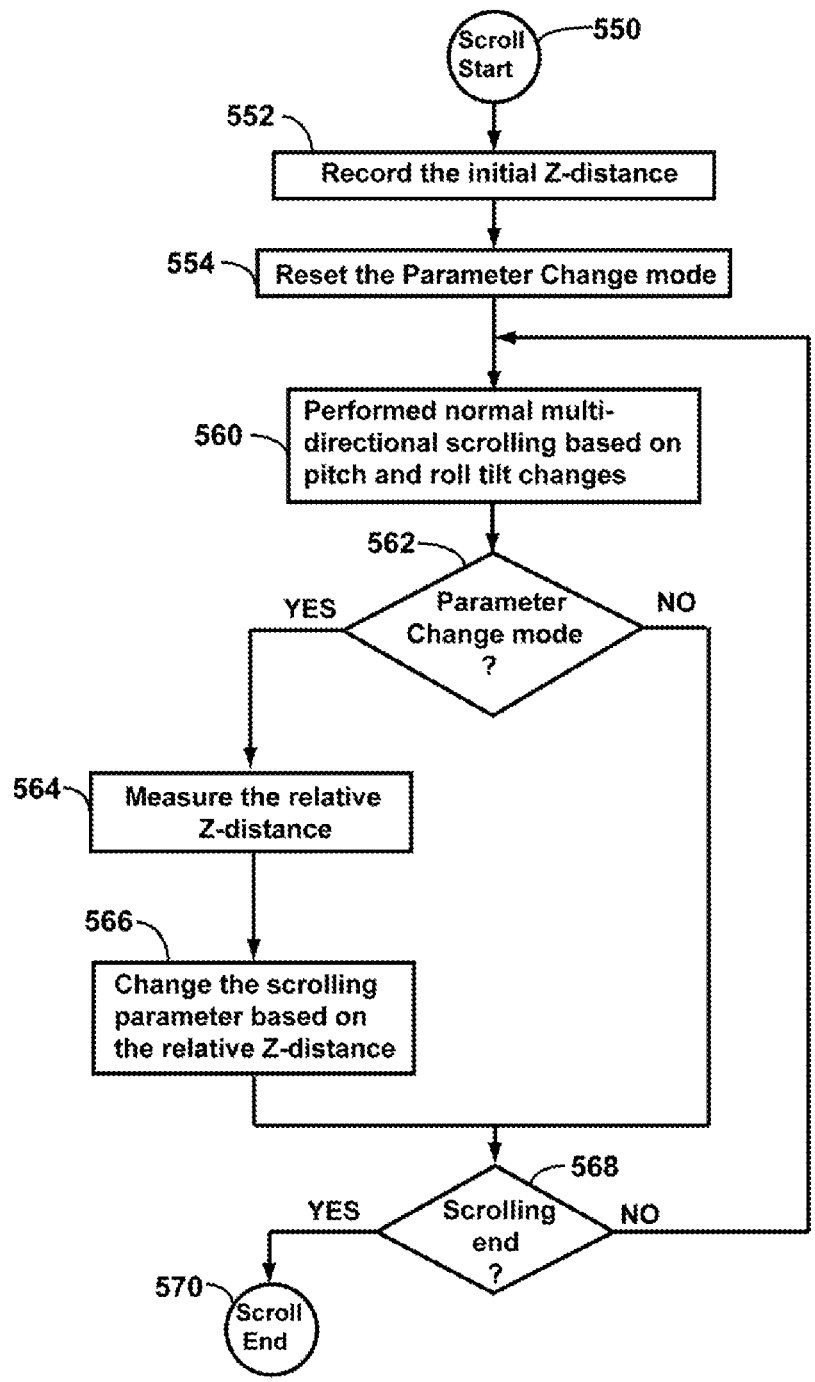
FIG. 20 shows the process flow diagram of changing the scrolling parameters in the multi-directional scrolling of FIG. 16 based on the distance from the screen view to the user's eyes.

FIG. 20 shows the process flow diagram of changing the scrolling intensity parameters based on the changes in the relative Z-distance when the scrolling Parameter Change mode is on. The user can activate the Parameter Change mode selectively, e.g. in response to a touch command at a predefined area of the screen view 42 (or on a specific switch or keyboard 23 that is embedded on the case). Alternatively, the user may also activate and deactivate the Parameter Change mode by predefined hand gestures, by finger tap commands or by other input means described in the discussion of FIG. 3.

At the start of scrolling 550, step 552 initializes the Z-distance parameter change process by recording the initial Z-distance. The initial Z-distance is used as a baseline to calculate the relative Z-distance from the currently measured Z-distance. Step 554 resets the Parameter Change mode and assigns the default (or the user setup) value to the scrolling intensity parameters. For the Dynamic Scroll mode, the scrolling intensity parameter may be the speed scale value, and for the Proportional Scroll, the scrolling intensity parameter may be the common tilt rotation range (or the vertical or the horizontal tilt rotation ranges).

Step 560 performs the normal tilt-based multi-directional scrolling based on the tilt changes around the pitch 62 and roll 60 axes. In some embodiments, step 560 performs a constrained vertical or horizontal scrolling. The scrolling intensity parameter can be changed when the Parameter Change mode is on, as determined in decision step 562. In some embodiments, the user may bring the device closer to the eyes and then return it to the original position in order to generate a predefined hand gesture that can be detected by monitoring the Z-distance. This predefined hand gesture may be used to activate and/or to deactivate the Parameter Change mode. If the Parameter Change mode is on, step 564 measures the current Z-distance and computes the relative Z-distance. Step 566 changes the scrolling intensity parameter based on the relative Z-distance. This can be implemented in a similar way to the disclosure of FIG. 19B, where the relative Z-distance replaces the dependency on the mapped tilt changes. The relation between the scrolling intensity parameter value and the relative Z-distance can follow the various relations (both linear and non-linear) and discussions that were described in conjunction with FIGS. 6 to 14, making the appropriate substitution of the relative tilt with the relative Z-distance. Decision step 568 terminates the scrolling if needed, or repeats the main branch of steps 560, 562, 564 and 566.

Alternatively, relative changes in the Z-distance can be sensed by integrating the linear acceleration twice along the Z-axis 90. Most modern hand held devices readily provide linear acceleration measurements for the X, Y, and Z directions from the motion sensor 20. A first integration of the Z linear acceleration gets an estimate of the speed of movement along the Z direction 90, and a second integration of the speed gets an estimate of the Z-distance change. These speed and distance estimates are not very accurate and may have a large unknown bias. However, step 566 uses only relative changes of the Z-distance to change the scrolling parameter, which tends to cancel the bias over the relatively short periods of parameter adjustment. When using linear acceleration to estimate the Z-distance, step 552 is not needed. It should also be noted that it is possible to use the estimates of the relative speed changes of movement along the Z direction to control the scrolling parameter. However, the use of the relative Z-distance changes is more easily conceived and controlled by the user than the use of relative speed changes.

Some embodiments of the present invention may include tangible and/or non-transitory computer-readable storage media for storing computer-executable instructions or data structures. Such non-transitory computer-readable storage media can be any available media that can be accessed by a general purpose or special purpose computer, including the processors discussed above. By way of example, and not limitation, such non-transitory computer-readable media can include RAM, ROM, EEPROM, or any other medium which can be used to carry or store desired program code means in the form of computer-executable instructions. Computer-readable medium may be also manifested by information that is being transferred or provided over a network or another communications connection to a processor. All combinations of the above should also be included within the scope of the computer-readable media.

Computer-executable instructions include instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, abstract data types, and the functions inherent in the design of special-purpose processors, etc. that perform particular tasks. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments described above may make reference to specific hardware and software components. It should be appreciated by those skilled in the art that particular operations described as being implemented in hardware might also be implemented in software or vice versa. It should also be understood by those skilled in the art that different combinations of hardware and/or software components may also be implemented within the scope of the present invention.

The description above contains many specifications, and for purpose of illustration, has been described with references to specific embodiments. However, the foregoing embodiments are not intended to be exhaustive or to limit the invention to the precise forms disclosed. Therefore, these illustrative discussions should not be construed as limiting the scope of the invention but as merely providing embodiments that better explain the principle of the invention and its practical applications, so that a person skilled in the art can best utilize the invention with various modifications as required for a particular use. It is therefore intended that the following appended claims be interpreted as including all such modifications, alterations, permutations, and equivalents as fall within the true spirit and scope of the present invention.

I claim:

1. A system for tilt-based view scrolling of a contents view of a device, comprising:
    a screen view displaying at least a portion of said contents view;
    a motion sensor configured to sense a first tilt angle of said device along a first direction and to sense a second tilt angle of said device along a second direction;
    one or more processors;
    memory; and
    one or more programs, wherein the one or more programs are stored in the memory and configured to be executed by the one or more processors, the one or more programs comprising:
        instructions for generating a first and second tilt signals, said first tilt signal is indicative of said first tilt angle and said second tilt signal is indicative of said second tilt angle;
        instructions for converting said first and second tilt signals into primary tilt changes along a primary direction assigned over said screen view;
        instructions for converting said first and second tilt signals into secondary tilt changes along a secondary direction over said screen view, said secondary direction is orthogonal to said primary direction;
        instructions for performing a constrained unidirectional scrolling of said contents view along said primary direction in response to said primary tilt changes; and
        instructions for modifying at least one control parameter in response to said secondary tilt changes.

2. The system of claim 1, wherein the instructions for modifying said at least one control parameter map the current value of the tilt angle along said secondary direction onto a modified value of said control parameter using a response curve.

3. The system of claim 1, wherein the instructions for modifying said at least one control parameter iteratively increment or decrement the value of said control parameter in response to said secondary tilt changes.

4. The system of claim 1, further comprising an augmented tilt control mode, wherein said modifying of said at least one control parameter is performed when said augmented tilt control mode is activated.

5. The system of claim 4, wherein said contents view is larger than said screen view in both horizontal and vertical dimensions, and wherein performing a multi-directional scrolling based on said first and second tilt signals when said augmented tilt control mode is deactivated.

6. A non-transitory computer readable storage medium encoded with a computer program, the program comprising instructions that when executed by one or more processors cause the one or more processors to perform operations comprising:
    acquiring a contents view for an application executing on a device with a screen view;
    displaying at least a portion of said contents view on said screen view;
    measuring at least two tilt angles along at least two directions over said screen view;
    converting said measured tilt angles into a primary tilt changes along a primary direction assigned over said screen view;
    converting said measured tilt angles into a secondary tilt changes along a secondary direction over said screen view, said secondary direction is orthogonal to said primary direction;

performing a constrained unidirectional scrolling of said contents view along said primary direction in response to said primary tilt changes; and modifying at least one control parameter in response to said secondary tilt changes.

7. The non-transitory computer readable storage medium of claim 6, wherein acquiring said contents view downloads said contents view from one or more servers accessed via an internet network connection.

8. The non-transitory computer readable storage medium of claim 6, further comprising activating and deactivating an augmented tilt control mode, wherein said modifying of said at least one control parameter is performed when said augmented tilt control mode is activated.

9. The non-transitory computer readable storage medium of claim 8, wherein said contents view is larger than said screen view in both the horizontal and vertical dimensions, and wherein performing a multi-directional scrolling based on changes of said measured tilt angles when said augmented tilt control mode is deactivated.

10. The non-transitory computer readable storage medium of claim 9, wherein said augmented tilt control mode is activated and said primary direction is assigned in response to a movement gesture.

11. The non-transitory computer readable storage medium of claim 9, wherein said modified control parameter is applied to said constrained unidirectional scrolling when said augmented tilt control mode is activated, and wherein said modified control parameter is applied to said multi-directional scrolling when said augmented tilt control mode is deactivated.

12. A computer-implemented method comprising:

acquiring a contents view for an application executing on a device with a screen view, wherein said contents view exceeds at least one dimension of said screen view;

measuring at least two tilt angles along at least two directions over said screen view;

converting said measured tilt angles into a primary tilt changes along a primary direction assigned over said screen view;

converting said measured tilt angles into a secondary tilt changes along a secondary direction over said screen view, said secondary direction is orthogonal to said primary direction;

performing a constrained unidirectional scrolling of said contents view along said primary direction in response to said primary tilt changes; and modifying at least one scrolling control parameter in response to said secondary tilt changes.

13. The method of claim 12, wherein said at least two directions for measuring tilt angles are orthogonal.

14. The method of claim 12, wherein said contents view is larger than said screen view in only a single dimension along the horizontal direction or the vertical direction, and wherein said primary direction is aligned with the direction of said single larger dimension.

15. The method of claim 12, further comprising activating and deactivating an augmented tilt control mode, wherein said modifying of said at least one scrolling control parameter is performed when said augmented tilt control mode is activated.

16. The method of claim 15, wherein said augmented tilt control mode is activated automatically once the total scrolling distance of said screen view along the same direction over said contents view exceeds a predefined length.

17. The method of claim 15, wherein said contents view is larger than said screen view in both the horizontal and vertical dimensions, and wherein performing a multi-directional scrolling based on changes of said measured tilt angles when said augmented tilt control mode is deactivated.

18. The method of claim 17, wherein said primary direction is assigned along the current scrolling direction of said multi-directional scrolling, said current scrolling direction is the most recent scrolling direction captured when activating said augmented tilt control mode.

19. The method of claim 17, wherein said modified scrolling control parameter is applied to said constrained unidirectional scrolling when said augmented tilt control mode is activated.

20. The method of claim 17, wherein said modified scrolling control parameter is applied to said multi-directional scrolling when said augmented tilt control mode is deactivated.

* * * * *